US007983455B2

(12) United States Patent
Moise et al.

(10) Patent No.: US 7,983,455 B2
(45) Date of Patent: Jul. 19, 2011

(54) SYSTEM AND METHODS OF ACQUISITION, ANALYSIS AND AUTHENTICATION OF THE HANDWRITTEN SIGNATURE

(75) Inventors: Gabriel Alexandru Moise, Onesti (RO); Marian Secrieru, Ungheni (MD); Adrian Dinescu, Bucharest (RO); Stefan Stelian Diaconescu, Bucharest (RO)

(73) Assignee: S.C. Softwin SRL, Bucharest (RO)

( * ) Notice: Subject to any disclaimer, the term of this patent is extended or adjusted under 35 U.S.C. 154(b) by 908 days.

(21) Appl. No.: 11/884,057

(22) PCT Filed: Feb. 1, 2006

(86) PCT No.: PCT/RO2006/000002
§ 371 (c)(1),
(2), (4) Date: Aug. 8, 2007

(87) PCT Pub. No.: WO2006/085783
PCT Pub. Date: Aug. 17, 2006

(65) Prior Publication Data
US 2008/0152202 A1 Jun. 26, 2008

(30) Foreign Application Priority Data
Feb. 9, 2005 (RO) .............................. A2005-00089

(51) Int. Cl.
*G06K 9/00* (2006.01)
(52) U.S. Cl. ........................................ 382/120; 235/380
(58) Field of Classification Search .................... 382/120
See application file for complete search history.

(56) References Cited

U.S. PATENT DOCUMENTS

| 4,680,804 | A | 7/1987 | Kuzunuki et al. |
| 4,736,445 | A | 4/1988 | Gundersen |
| 5,940,533 | A | 8/1999 | Gentric |
| 5,991,441 | A | 11/1999 | Jourjine |
| 6,229,102 | B1 | 5/2001 | Sato et al. |
| 6,766,944 | B2 * | 7/2004 | Silverbrook et al. ......... 235/380 |
| 7,155,038 | B2 | 12/2006 | Kiyono et al. |
| 2002/0067350 | A1 | 6/2002 | Ben Ayed |
| 2002/0148655 | A1 | 10/2002 | Cho et al. |
| 2004/0032399 | A1 | 2/2004 | Sekiguchi et al. |

FOREIGN PATENT DOCUMENTS
EP 1130537 A3 5/2001
* cited by examiner

*Primary Examiner* — Samir A Ahmed
*Assistant Examiner* — Ruiping Li
(74) *Attorney, Agent, or Firm* — Andrew Wilford

(57) ABSTRACT

A person making a handwritten signature performs a series of three-dimensional movements with a plane graphical finality. The movements generate kinetic information perceived by a special pen that the signature is performed with (the writing and digital acquisition device for the primary bio-kinetic information). The information, concordant to the afferent bio-kinetic pattern, is collected by included MEMS type acceleration sensors in the pen. The system analyzes the generated information (the signals) and determines the dynamic-biometrical characteristics based upon the biometrical dimension of the information. The characteristics are transformed into data vectors and invariants that are stored in a database. Based on algorithms, the system performs the required comparisons between the spatial kinetics of the specimens and the kinetics of the entrances and obtains distance-type answers. In statistical terms, the results are related to the entire subject database, by interpreting and sampling methods.

10 Claims, 15 Drawing Sheets

Physical structure of the authentication system

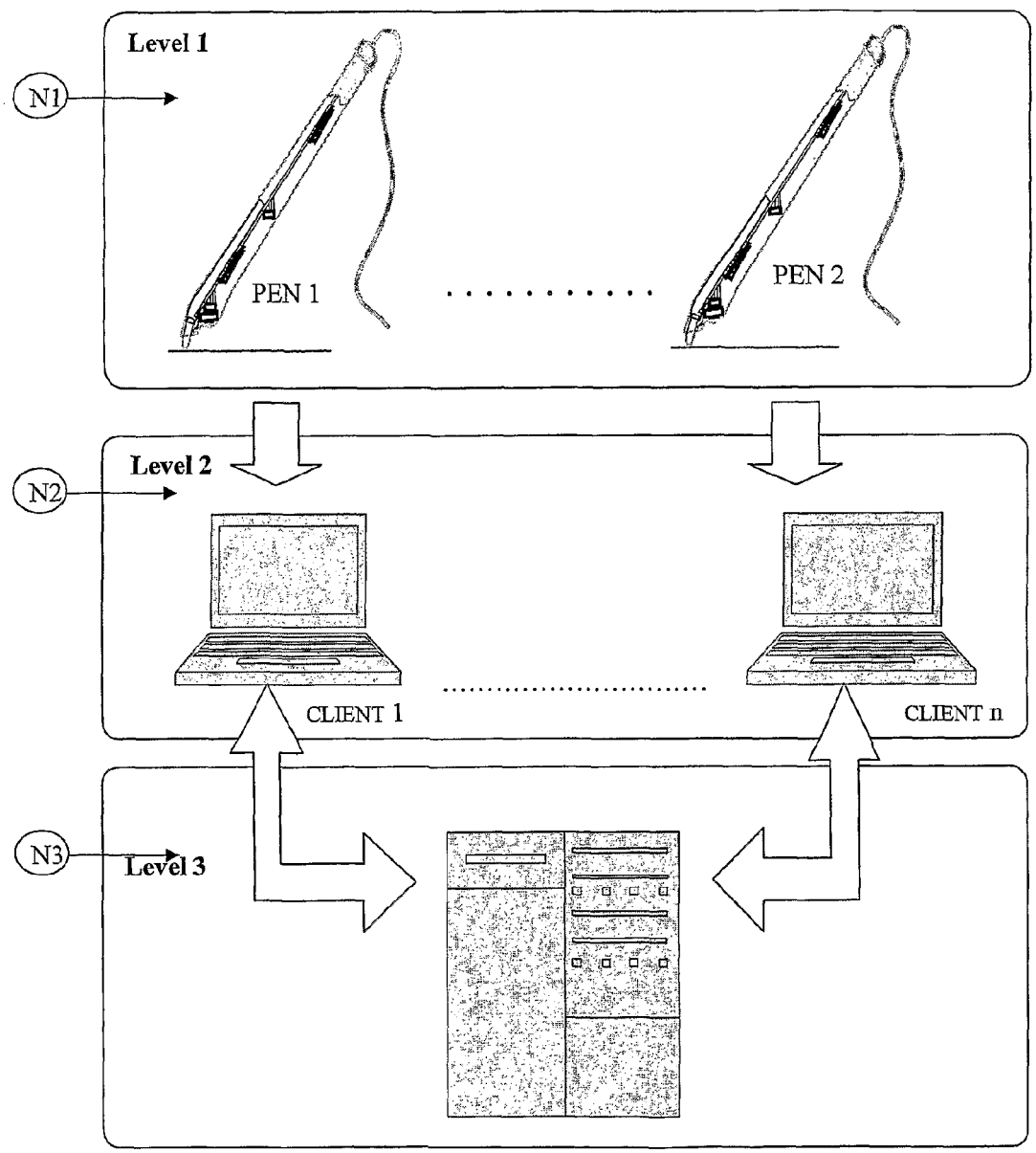
Figure 1 – Physical structure of the authentication system

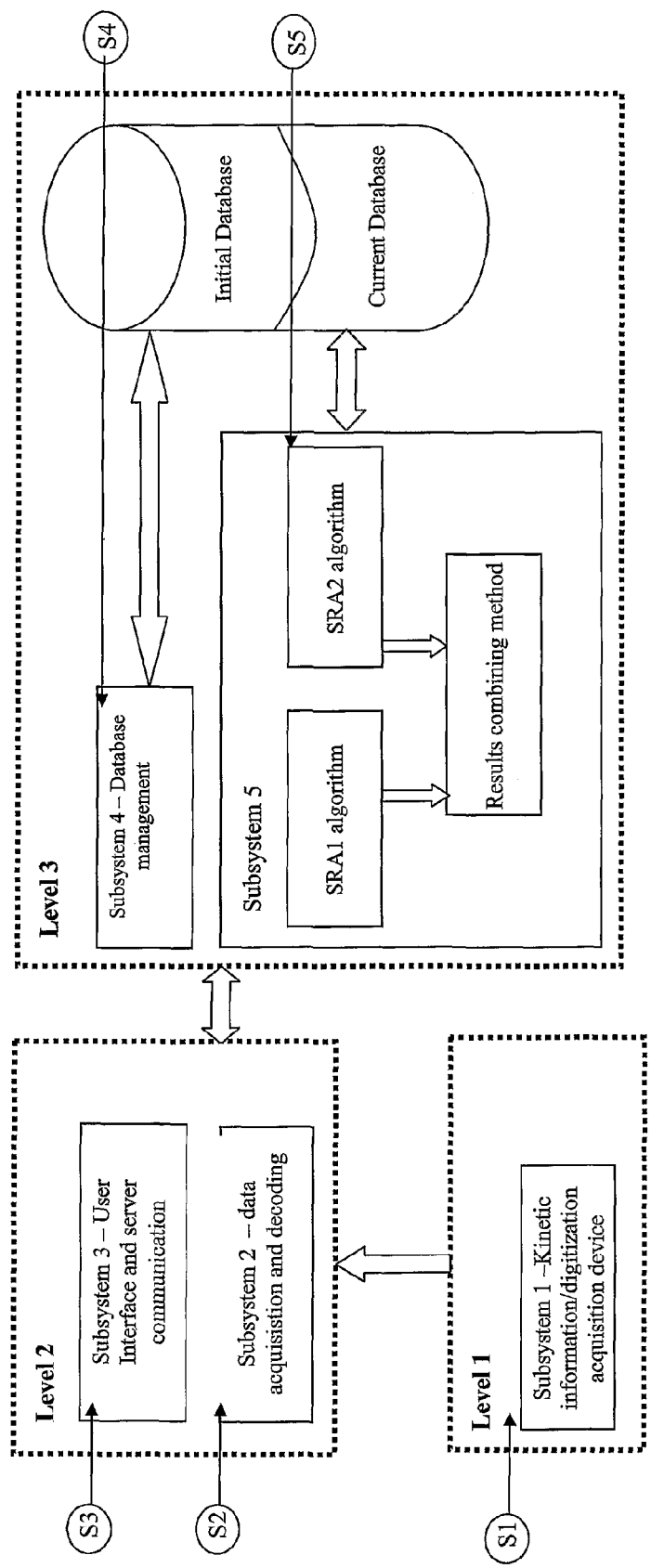
Figure 2 – Functional structure of the authentication system

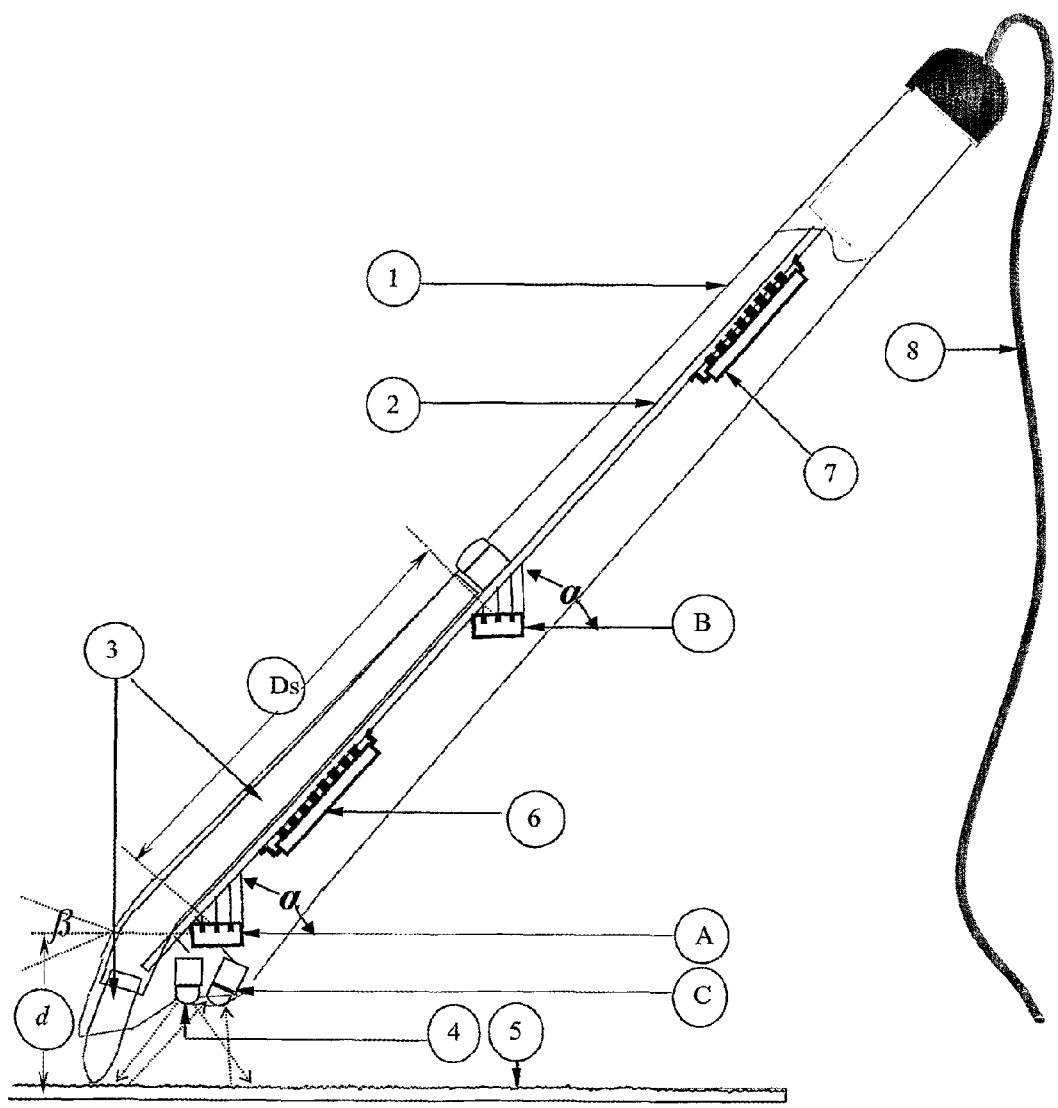
Figure 3 – Subsystem 1 topology—writing and kinetic pattern's digital conversion in electronic format (pen)

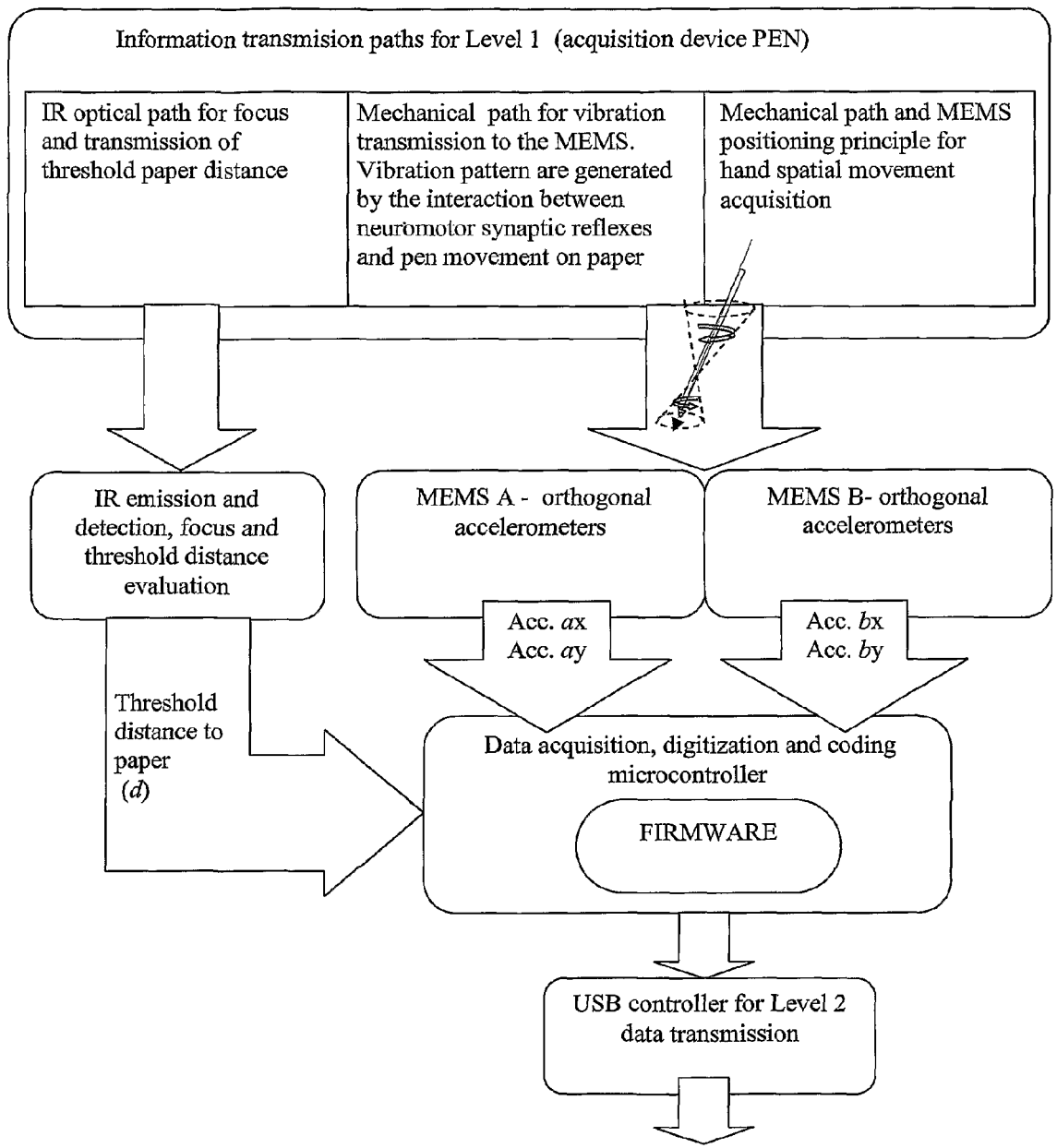
Figure 4 – Information flow diagram in subsystem 1

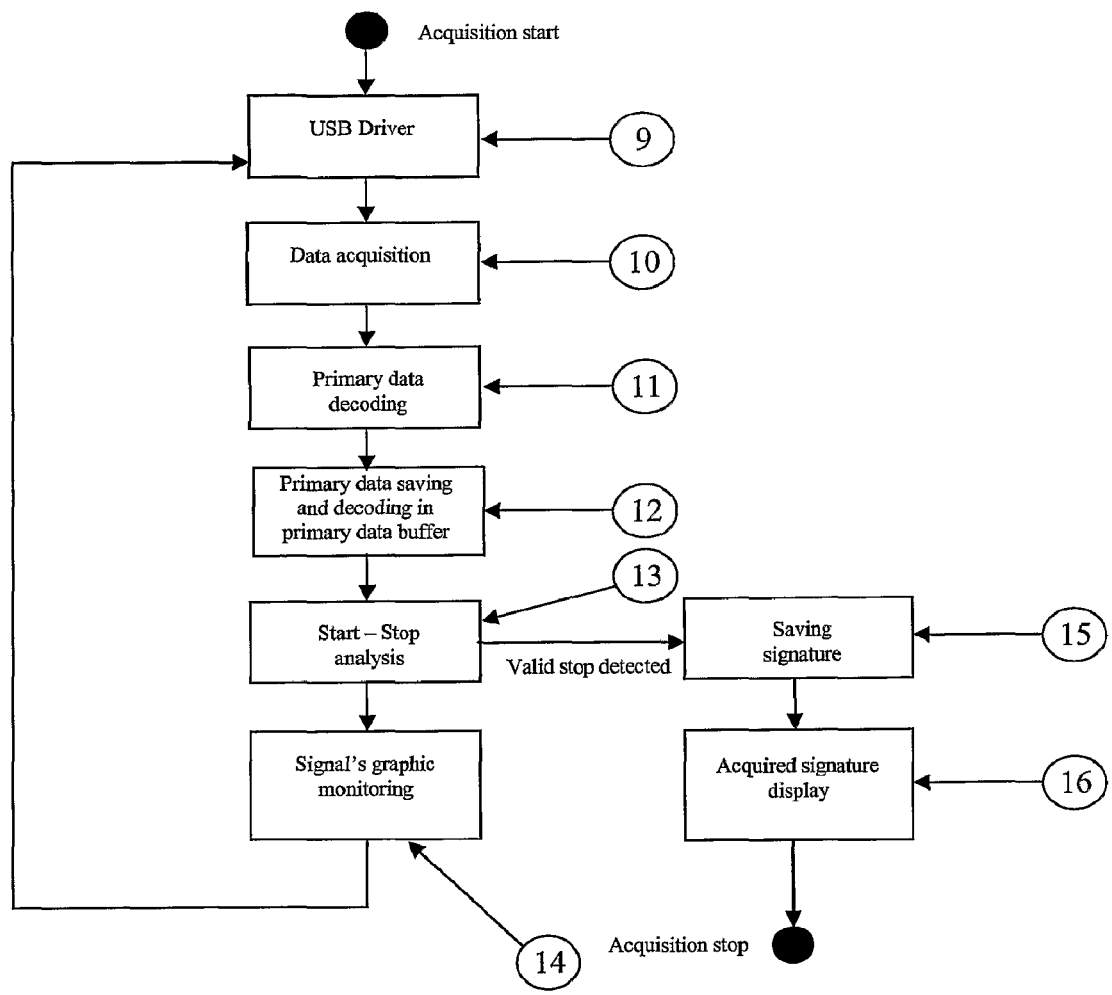
Figure 5 – Signature acquisition process diagram by subsystem 2

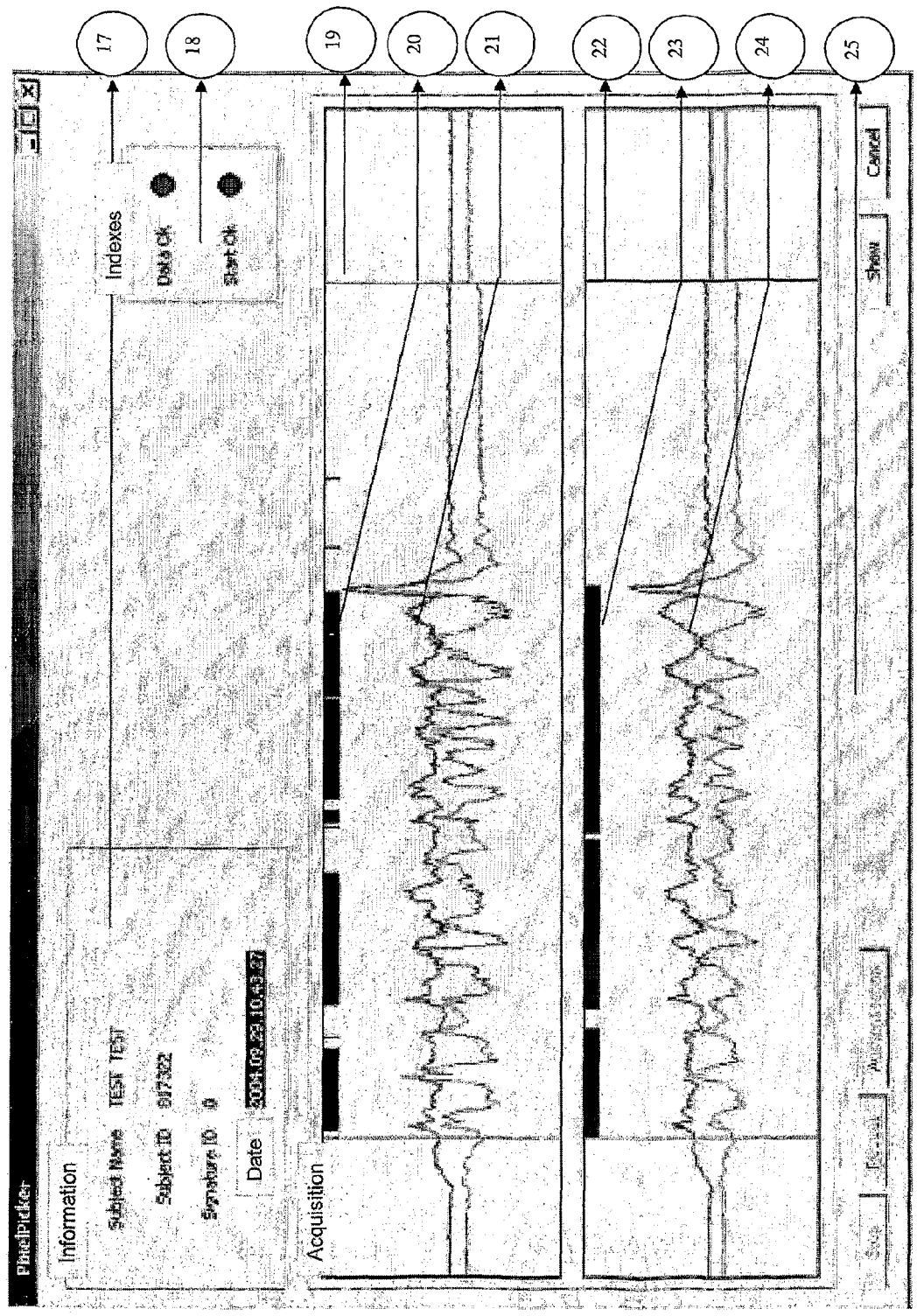
Figure 6 – Acquisition monitoring interface window

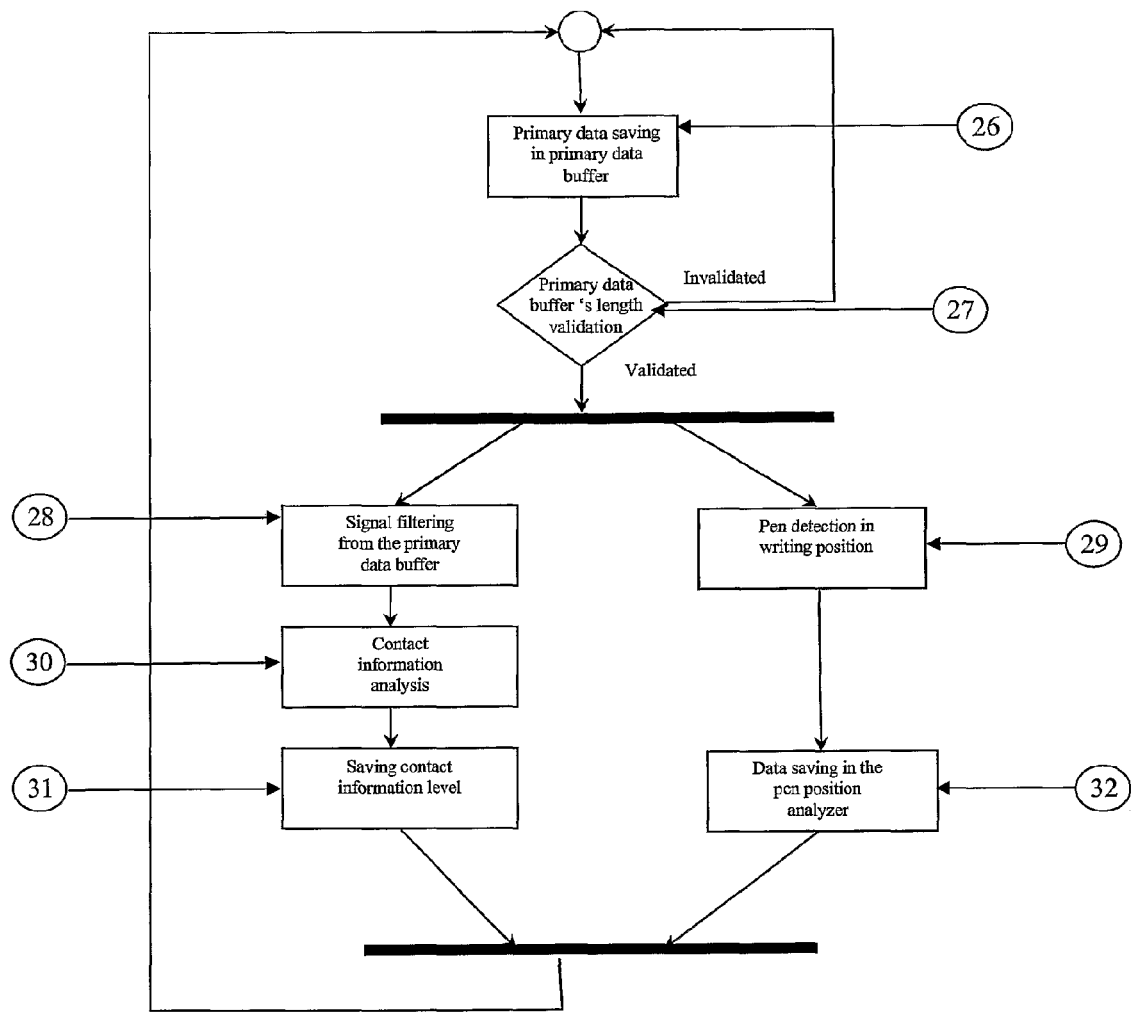
Figure 7 – Data processing diagram by the determination method start-stop

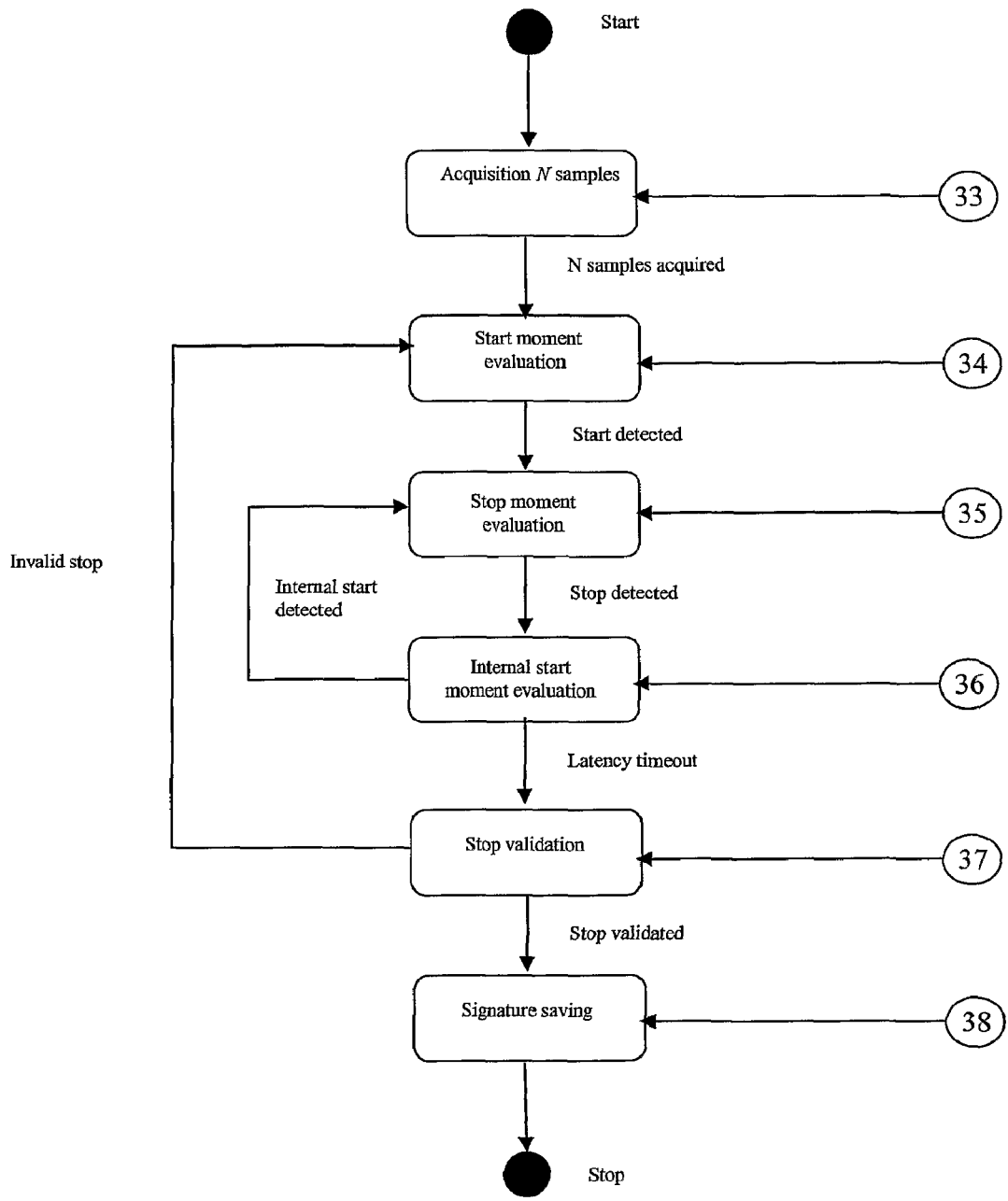
Figure 8 – State machine diagram - The start - stop method

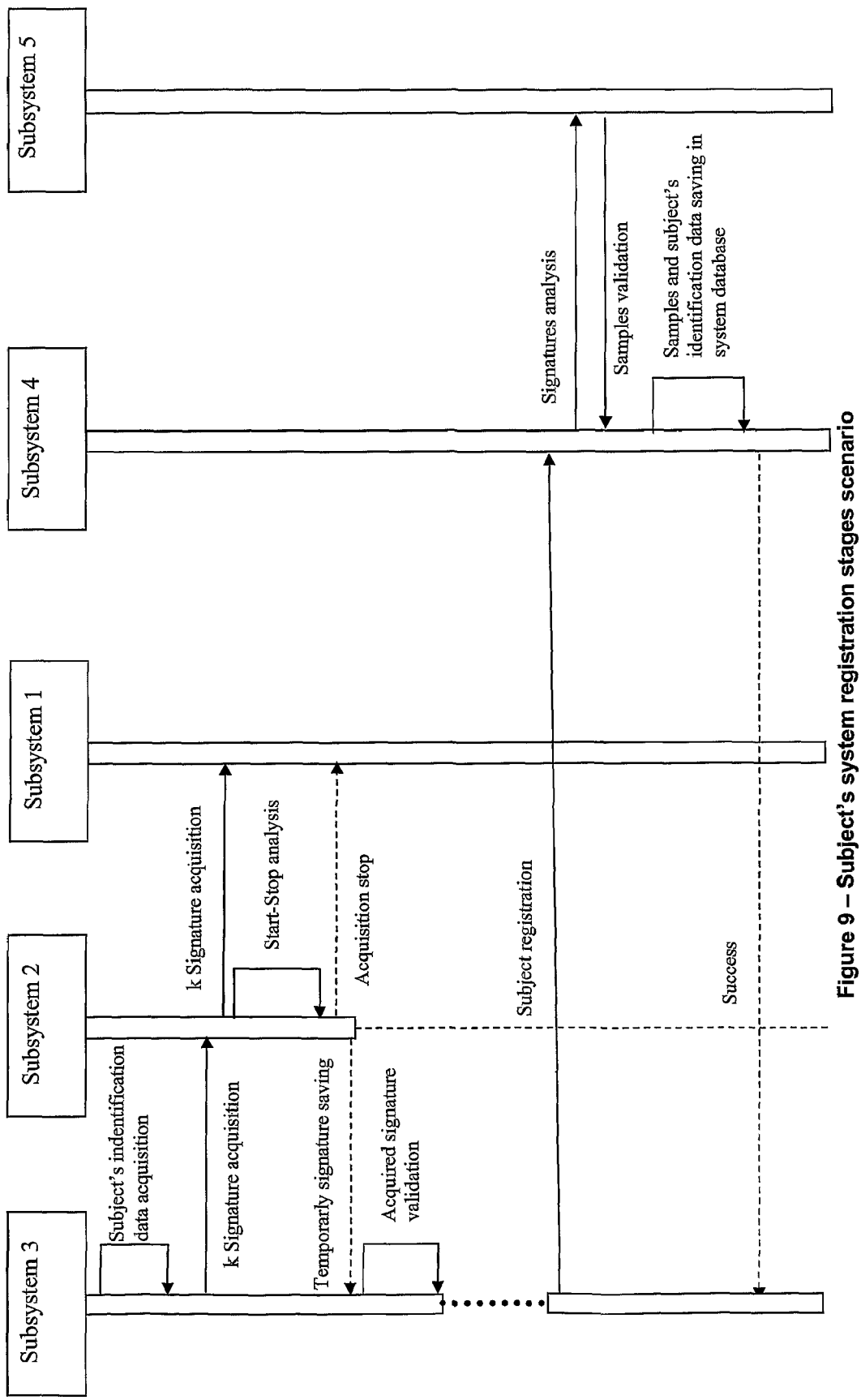
Figure 9 – Subject's system registration stages scenario

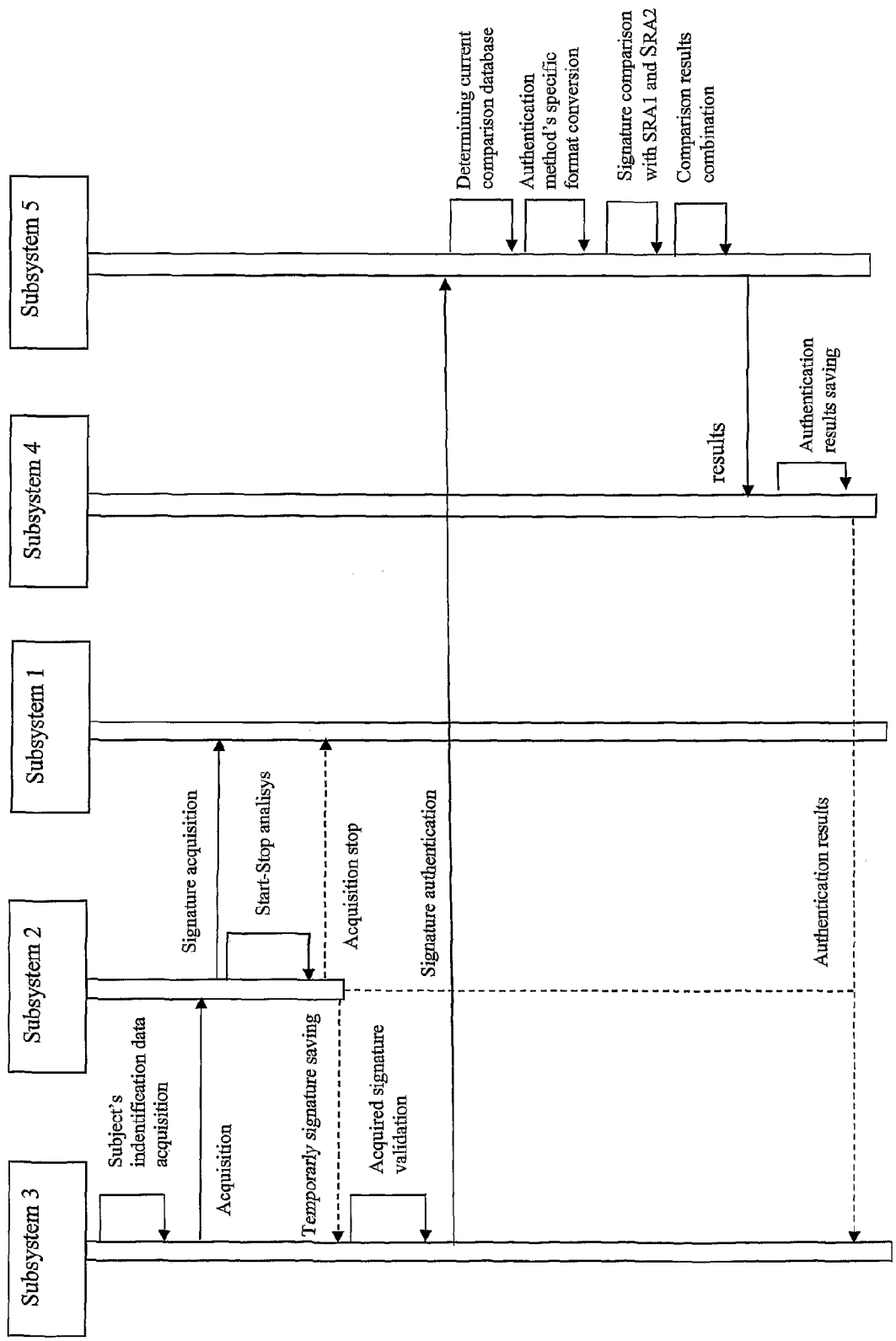
Figure 10 – Subject's authentication stages scenario

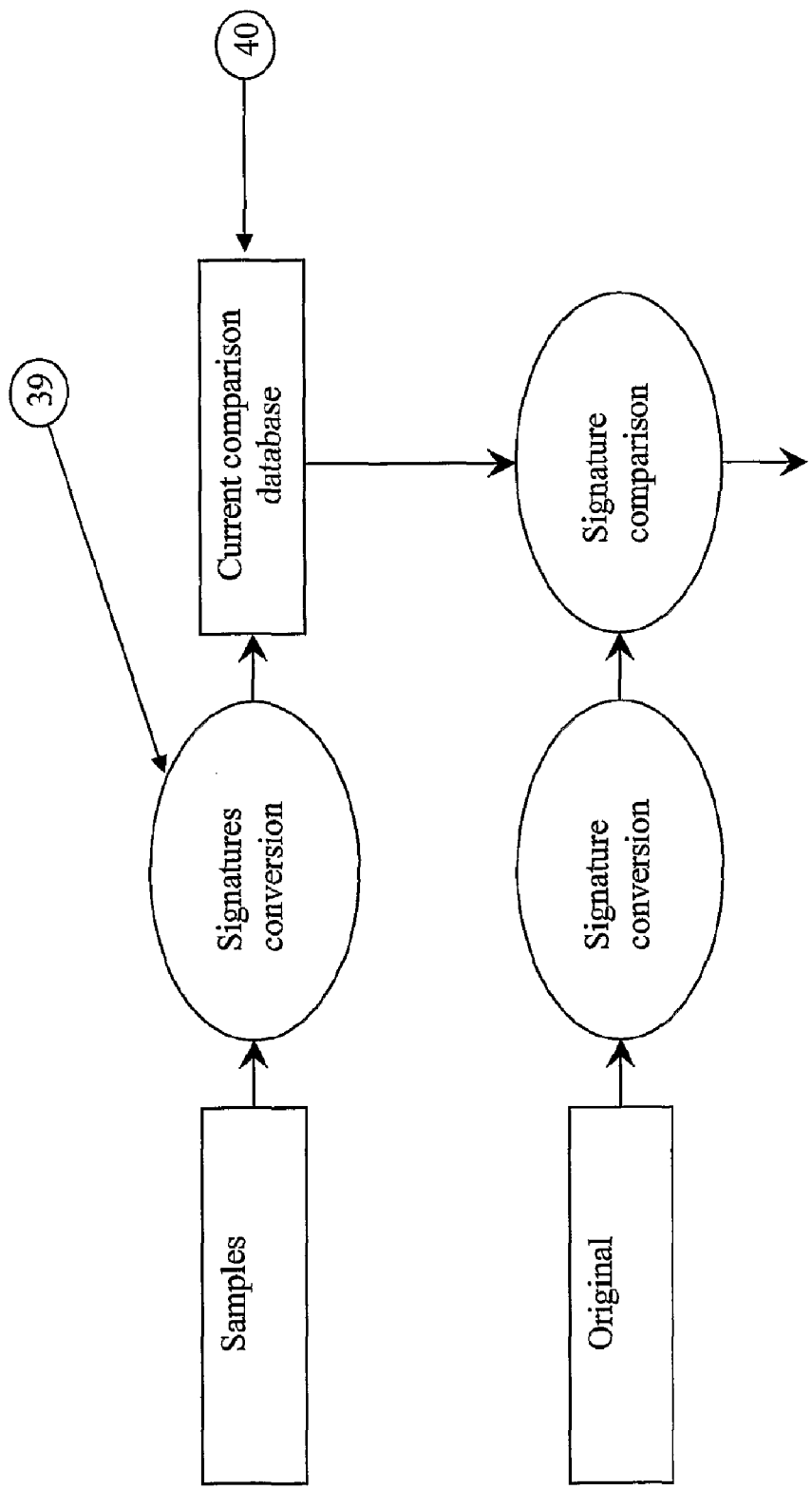
Figure 11 -SRA1 – Signatures conversion and comparison

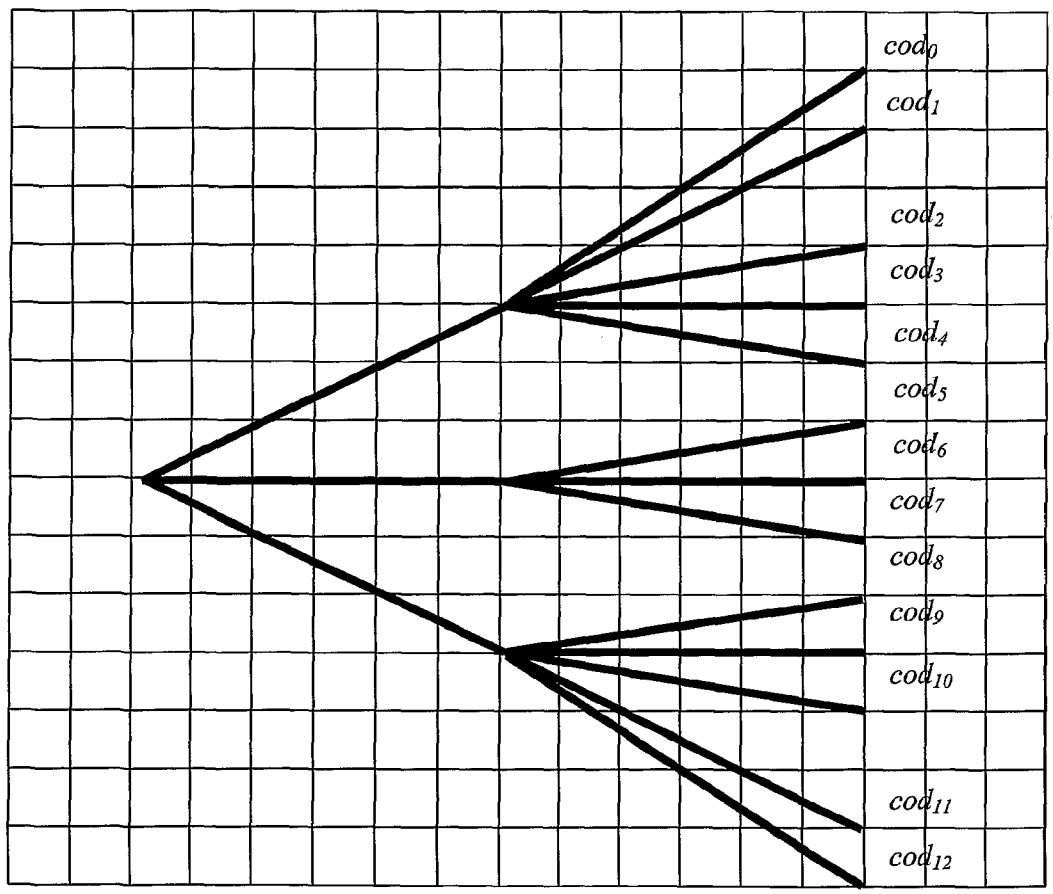
Figure 12 – SRA1 – Invariants definition diagram for n = 3

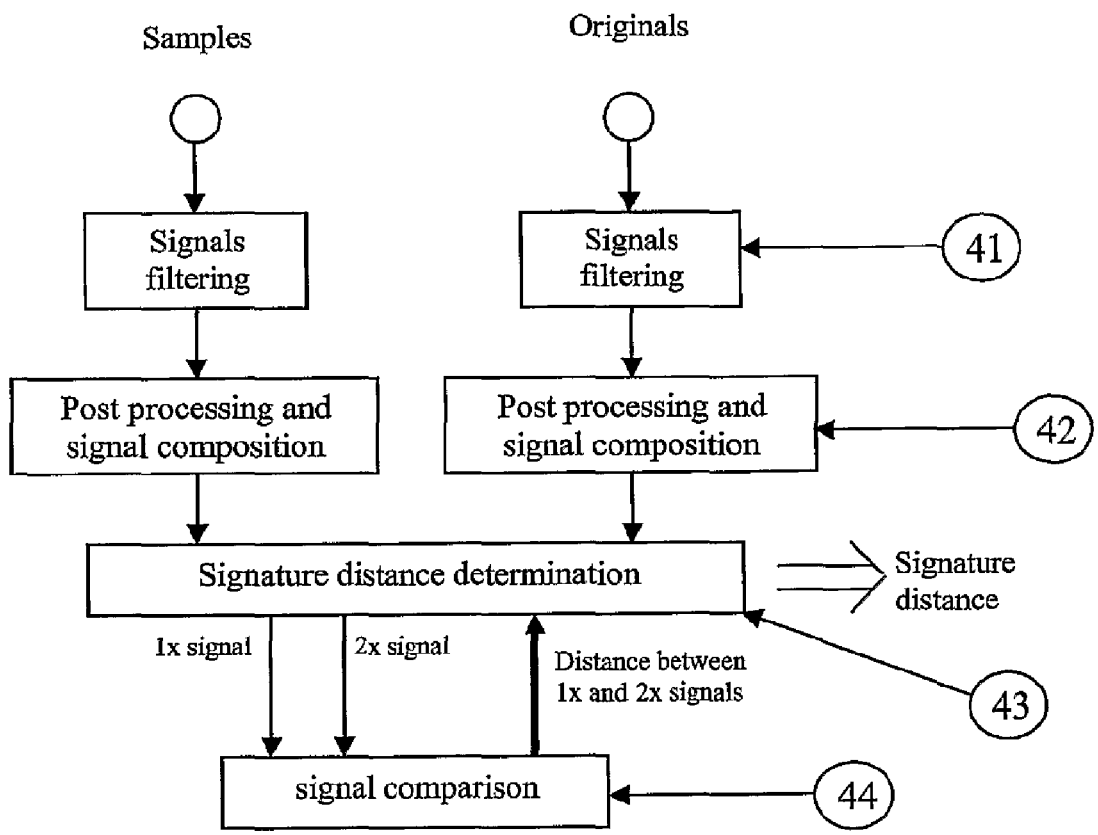
Figure 13 - SRA2 - Signatures conversion and comparison

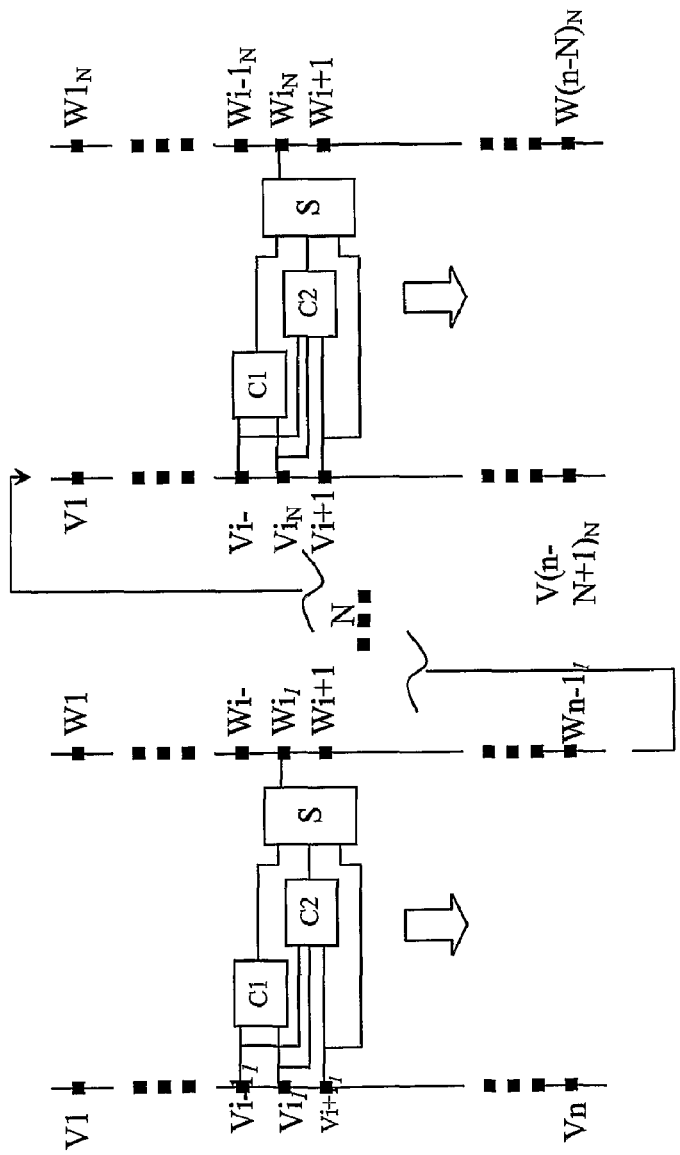
Figure 14 – Filtering method for SRA2

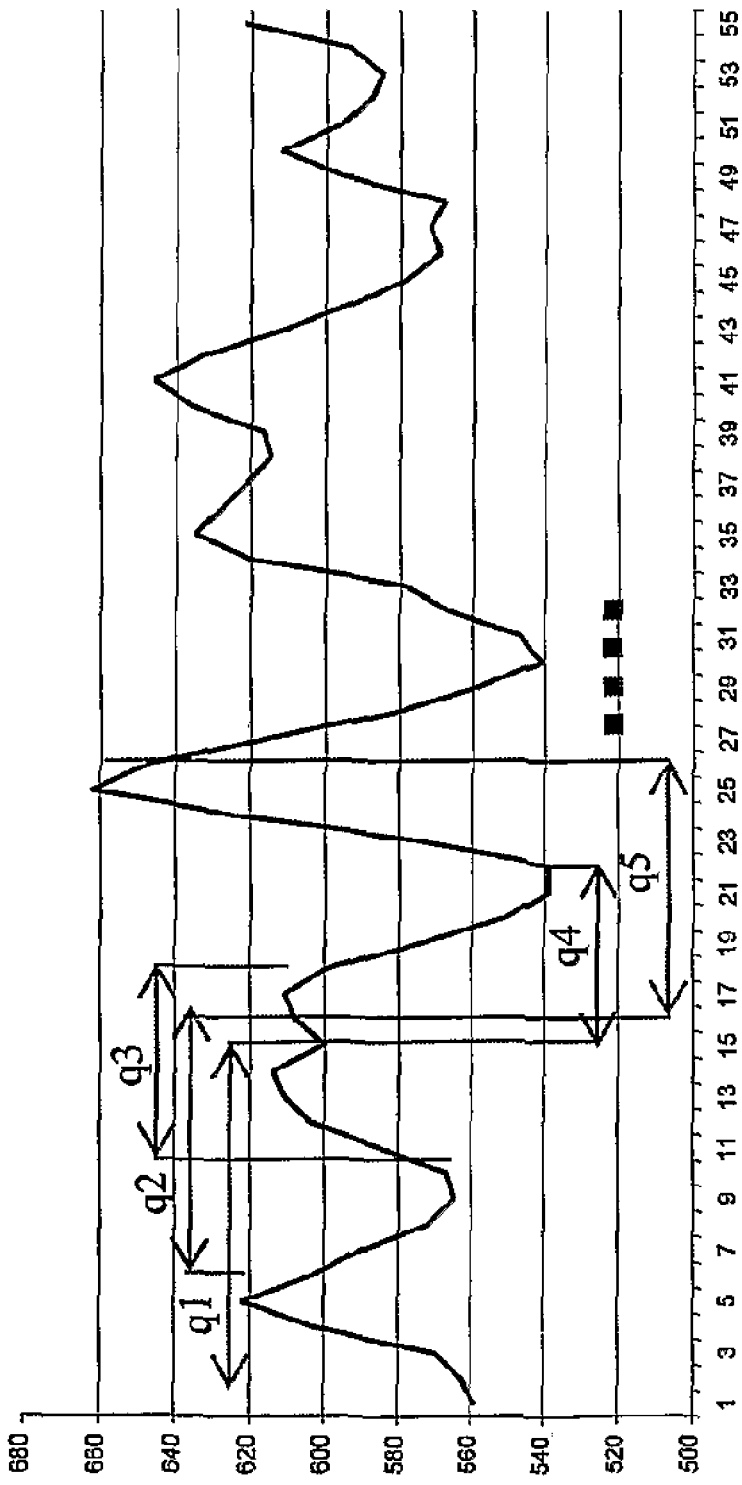
Figure 15 - SRA2 - Dividing a signal in sections

SYSTEM AND METHODS OF ACQUISITION, ANALYSIS AND AUTHENTICATION OF THE HANDWRITTEN SIGNATURE

CROSS-REFERENCE TO RELATED APPLICATIONS

This application is the US national stage of PCT application PCTG/RO2006/000002 Filed 1 Feb. 2006 with a claim to the priority of Romanian patent application a 2005-00089 filed 9 Feb. 2005.

FIELD OF THE INVENTION

Certifying a person's identity also implies, in some activities, authenticating his signature. Signature checking is a common issue in many areas of the human activity which must be solved in a short time: obtaining various financial rights, gaining information access, physical access in special regime areas, expressing the willingness agreement in a public or private context.

The invention subject-matter consists in a computer-based system and methods for the acquisition, analysis and authentication of the handwritten signature, designed for being applied as a bio-metric link in the person's authentication procedures chain.

BACKGROUND OF THE INVENTION

The proposed system (a hardware-software assembly and the recognition methods) may be used on a large scale in the signature authentication procedure, with a minimum discomfort regarding the usage procedure and comparatively low costs. Therefore, the present invention creates the premises for the applications development in the information technology field in multiple social and individual interest areas.

The applicability domains of the system cover the following fields of interest:

Patrimonial, Financial transactions, etc. Function: link in checking systems;

Security in the field of virtual or physical access control systems. Function: link in security systems;

Companies and institutions management. Function: authenticating the signature in software applications of Document Management/Workflow Management type, for companies with a large number of employees or distributed staff. Protection of electronic documents.

Applying the invention herein presented in these activity domains has the following results: it increases the user's level of trust in the above-mentioned fields, minimizing the losses due to the identity frauds, reducing the signature checking time in the domains where the classic procedures require this action, discouraging the frauds committed by forged identity.

In the invention's description, we shall use the following notions:

Subject: Person that uses the system for registering the sample signatures in the database, in order to authenticate an original signature or attempt to authenticate a forged one.

Signature: Represents the subject's action, consciously started, by free will but with a reflexive inherited motion character, by manually using a writing instrument and having a plane graphic result in a predetermined space. The subject commits to be able to reproduce this action proportionally from the spatial-temporal point of view. The signature's purpose is the subject's recognition based on the comparison between the sample signature and the original signature and admitting to a third party the action of deciding whether the signature is or not authentic.

The (signature's) (bio) kinetic pattern: The way the movements of the biomechanical assembly handwriting tools take place, in order to perform the signature. These movements are partially transposed under the form of the graphical signature, by the practical extremity of the writing instrument on normal writing paper, in usual document format of the public or private life. The (bio) kinetic pattern may be electronically acquired and memorized. The (bio) kinetic signature pattern notion assimilates with the signature notion.

Sample signature (herein shortly referred to as sample): Signature stored in a signatures database and used in order to subsequently certify (authenticate) a person that performs in this purpose a new signature (original signature).

Original signature (herein shortly referred to as original): Signature given by a person in order to be certified (authenticated) by the system, when compared with other signatures (sample signatures) formerly given by the same person—subject—and stored in a signatures database.

Forged signature (herein shortly referred to as forgery): Signature given by an X person that claims to be the Y person and signs in the name of Y or signature given by the X person who signs in the name of X but under constraint.

Authentication: Set of methods applied to the bio-kinetic patterns from the current base, by which it is determined whether the X person that signs in original is indeed the X person that signed the samples set (from the signatures database) that were registered as belonging to the X subject.

Current database: Initial database plus the bio-kinetic patterns of the subjects' samples and authenticated originals.

Current comparison database: Set of signatures formed of the samples of a number of subjects representing a specimen (randomly extracted) from the current database plus the signatures of the subject targeted by the entrance signature.

Initial database: The minimum database required for the system to function at the established parameters, containing the bio-kinetic patterns of the sample signatures belonging to the targeted orthographical culture (alphabet) (for example: Latin, Cyrillic, Hebrew, Chinese, etc.). The initial database may also contain the bio-kinetic patterns of the signature samples belonging to mixed orthographical cultures.

Level: Physical and functional hierarchy within the authentication system, containing specific functional subsystems and the method structures housed by said systems.

Pen: Ensemble composing the level 1 subsystem, composed by the writing device and the sensitive-kinetic-computer based elements required for capturing the bio-kinetic pattern.

MEMS (micro-electro-mechanical-systems): micro-sensitive-electro-mechanical-system realized by nanotechnology.

Contact Information: Biometrical information incorporated in the signature, required to delimitate the signature. It manifests because of the synaptic neuromotor reflex mechanism, representing the modulation of the micro-vibrations generated by the interaction of the subject with the paper, by means of the pen. The MEMS sensors capture it, on the manifestation directions. The biometrical information is intrinsically mixed with the other bio-kinetic information specific to voluntary or semi-reflex writing.

Context information: Information regarding the manner the pen is positioned near the writing paper. It is expressed by the detection of a threshold distance to the paper, being one of the keys required to delimit the signature from other kinetic actions of the subject.

When it is required to authenticate a signature, specialized people perform the classic procedure. The analysis and decision action regarding a handwritten signature's authenticity represents one of the objects of the graphology technical expertise science. In order to establish a signature's authenticity, the person endowed with this function uses graphical and static projections of the signature performing complex action, in the paper plan. Following the analysis, there are deduced dynamic actions specific to the subject that performed the signature, materialized in the type of characteristic speed, acceleration, pressure, sequences and shapes.

Authenticating the handwritten signature in the classic manner has the following disadvantages, among others:

- It contains a certain error quotient, statistically expressed and depending, among others, on the momentary analysis capacity of the person charged to check the signature;
- It may be influenced by external factors, such as the expert interest or self-partiality;
- It requires a rather long period of time of measurement, analysis, comparison and decision;
- It arbitrarily presumes as true, the free-will expression;
- The information is only extracted from the paper plan level and it unilaterally reflects only the graphical effects of the subject action;
- The physic units speed, acceleration, pressure and the specific invariant graphic shapes, are indirectly deduced, by visual observation and deduction, procedures that imply a high level of approximation;
- The spatial information, corresponding to the complex kinetic of the movements transmitted to the writing tool by acquired reflex gestures, by the specific hand geometry and synaptic type neuromotor interactions, is ignored;
- The required experience and knowledge from the graphological expertise field is transmitted with considerable efforts and, is refined after a long period.
- Regarding the classic graphological technical expertise for signature authentication, its price is several times superior to an automatic checking and practically it can take place only after the fraud's negative effects are produced and tracked down.

The studies and investigations in the field of the automatic authentication based on the bio-kinetic pattern represent an alternative, recently approached domain of biometry. The efforts target the developing of authentication technologies, which are necessary to the informational society. The handwritten signature is used as a quasi-universal way to identify and authenticate alphabetized people. Therefore, the authentication methods based on the signature's bio-kinetic pattern are natural, normal, and non-intruding.

There are few studies in the specialty literature referring to the authentication procedures based on the bio-kinetic pattern. There are mainly some patents on this theme. Until now there is no information about any commercial applications based on acceleration sensors realized by MEMS nanotechnology and using the principles and methods of the present invention, implemented on the signature authentication purpose. The problem was approached only at a laboratory level and until now there has been performed little research upon this subject worldwide.

There are granted patents for authentication systems that analyze static and/or dynamic features of the handwritten signature. The ones that analyze the dynamic characteristics are more performant than the former ones, analyzing only the static characteristics.

Presently, there are commercial applications in the handwritten signature analysis authentication field, that use methods and technologies different from the one proposed by the invention herein presented: the graphics table, graphic scanning and certifying, dynamic capture of graphic images with CCD sensors, writing on "intelligent paper" based on standing markers. These solutions maintain some of the disadvantages mentioned in the case of human graphical expertise, namely:

- The information subjected to analysis is extracted only from the paper plane level and it unilaterally reflects just the graphic effects of the subject's action;
- The parameters: speed, acceleration, pressure, are indirectly deduced by procedures that imply a high level of approximation;
- The spatial information is ignored corresponding to the complex kinetic of the movements transmitted to the writing tool by acquired reflex gestures, by the specific hand geometry and synaptic type neuromotor interactions.

In addition to these disadvantages, the mentioned solutions introduce dedicated adjacent devices: the graphics table, intelligent paper, scanner, thus increasing the costs and the complexity of exploit.

There are few patents in the field of biometrical authentication based on bio-kinetic pattern of handwritten signature describing systems and methods which, by the nature of the analyzed parameters or the way of acquisition and processing, are tangent to the present invention. As reference for comparison and for defining the claims in the present invention, we quote two of these patents considered as relevant: U.S. Pat. No. 4,128,829—(Herbst et al) and U.S. Pat. No. 6,236,740—(Lee et al.).

In the U.S. Pat. No. 4,128,829—(Herbst et al) the information is generated by two acceleration sensors orthogonally positioned in the pen and an axial pressure sensor. The information is digitized at an 8-bit resolution in an exterior module of the pen. The comparisons between the signatures are realized by information segmentation and seeking the maximum crossed correlation. The final decision is of the threshold type, the acceptance or the rejection depending on the position of the correlation answer's value against an arbitrarily chosen threshold (0.8). The decision is taken after the comparison between the entrance signature and the targeted subject's sample signature.

The following disadvantages remain in this patent:

- The information corresponding to the complex spatial kinetic of the movements transmitted to the writing tool is ignored, as the acceleration sensors are at a single plane level;
- The information corresponding to the synaptic type neuromotor interaction is lost, on one hand because Herbst pleads that the neuromuscular feedback is exclusively performed by the slow "muscle-brain-muscle" cycle, ignoring thus the effects of the local synaptic reflex, at the hand bio-functional level; on the other hand, its system acquisition and post-processing parameters don't allow the acquisition of the synaptic reflex specific information;
- Using an axial pressure sensor partially and indirectly regains the information corresponding to the lost synaptic type neuromotor interaction, but in the same time it introduces specific disadvantages such as inconsistent detection of the moments in which the subject establishes contact with the writing paper, the pressure's variability depending on: the way the subject is positioning when writing, paper type, etc.;

The threshold decision method is inflexible to the signature natural variability and even more, it is impossible to calculate a generally valuable threshold as it varies from one subject to another.

In the U.S. Pat. No. 6,236,740—(Lee et al.) the analyzed entrance information is generated while performing two actions: the signature and the subject's performing an imposed set of digits: from 0 to 9 in case of samples and, of digits expressing the current date, in case of the signatures that are about to be authenticated. Two pressure sensors located in the pen capture the information to be analyzed, such that electrical signals, proportional to the pressure exerted in the writing peak, are acquired by mechanical elements. The two signals produced by the sensors represent the pressure discomposure on two pen directions: axially and laterally. The information's digitization takes place in an exterior module of the pen. The information analysis is processed upon a parameter defined by momentary ratio of the two pressures, named relative gradient angle and considered relevant in order to differentiate the signatures. The decision and analysis methods are performed by the threshold adaptable type of evaluation of the result of the comparison between the entrance signatures and several specimens of the targeted subject, including the imposed digits. The analysis methods combine the information segmentation and its global evaluation.

The following disadvantages remain in this patent:

The information corresponding to the plane and spatial kinetics of the movements transmitted to the writing tool is ignored, as there are no sensors to notice the pen movements. The information corresponding to the pen movement on the paper is indirectly and appreciatively transposed in the pressure information, which explains the maintenance of a certain functionality;

The constructive mechanical elements having direct functions on the sensors virtually diminish the reliability of the solution;

The digitization of the electrical signals containing the analyzed information outside the pen implies the possibility to affect them by external perturbations;

Using the pressure sensors approximately, partially and indirectly distinguishes the information corresponding to the synaptic type neuromotor local interaction and it also introduces specific disadvantages such as an inconsistent detection of the paper contact moments, pressure variability depending on the writing position, paper type etc.

The analysis and decision method is applied by evaluating the result of the comparison only between the entrance signature and the sample signatures of the targeted subject.

The analysis, comparison and evaluation methods from the above presented inventions, apply only between the entrance signature and the specimen signature of the targeted subject. Therefore, the principle of category affiliation by the differentiation and manner to relate regarding the other categories, respectively comparing to other subject's samples as well, is ignored.

The herein presented invention removes the mentioned disadvantages by the new concept of realizing the acquisition device regarding the nature, signification and detection of the complex information generated during the signature process, by functionally integrating the subsystem that forms the acquisition device in a computer based authentication device.

The algorithmic methods and the procedures implemented in the computer based authentication system by specific programs, indissolubly related with the processed entrance information, apply not yet exploited principles from this science field and considerably improve the methods of the already applied principles.

The main impediment that maintained the lack of commercial potential applications, based on the spatial bio-kinetic analysis, has been until recently the lack of necessary technologies, namely the absence of MEMS acceleration sensors (http://www.memsnet.org), sufficiently miniaturized and performant, for a satisfactory capture of the complex accelerations produced to the writing instrument, by the hand, during usage. From the cost point of view regarding the information acquisition by accelerometer type sensors, until 2002, the costs were well beyond the limits of the commercial efficiency for a single acquisition channel as, in order to obtain quality information, there are necessary multiple acquisition channels. From the commercial efficiency point of view, the MEMS acceleration sensors allow conceiving acquisition devices/systems at competitive prices. At the end of 2001. The Nanotechnology Research Centers MIT and Analog Devices realized and launched in production a MEMS acceleration sensor with superior quality-price performances; therefore this research action was started off and the result is the object of the herein presented invention, targeting usage of this new type of sensor. Another research project XWPEN, based on the same technology (from the point of view of the sensors that were used), carried out in the Microsoft Hardware Research laboratories, studied another application (a terminal for handwritten input and recognition), did not reveal to the public the specific technical elements and it aimed at obtaining applicable results by the end of the year 2004.

The sensitivity of the MEMS nanotechnology sensors is of mg class, with a $\mu g/\sqrt{Hz}$ (g=gravitational acceleration) noise factor class. Grace to the sharp sensibility and the frequency characteristics, these sensors fulfill the conditions required to be included in the construction of the new capture devices/systems for the slightest informational components of the handwritten signature bio-kinetic pattern. It is also to be mentioned that in the herein invention there are used MEMS sensorial modules; each of them integrating, by construction, two acceleration sensors, orthogonally located with respect to one another.

In the herein presented system, the assembly of movements required to realize the handwritten signature transmitted to the writing device define the kinetic pattern of said signature and, implicitly, the person's. The kinetic pattern contains informational structures specific to the person that performs them. The high complexity of these informational structures, because of the physical parameters that might shape them, their dynamics and context variability, practically excludes the possibility to determine a metric defining pattern. The graphic shapes and tracks impressed on the paper may be considered an incomplete and conjectural projection, in the paper plane, of the assembly of these movements, acting like a reflex visual feedback, necessary to perform the mentally intended action—the signature.

The writing paper is made up, among others, of cellulose micro fibers. Their randomly disposal creates asperities at a microscopic level. At macroscopic level, the disposal of asperities in the paper plane is constant, this property being imposed by the technologic process for making the paper, according to the standards in the field. During the writing action, due to the interaction between the paper and the usable extremity of the writing tool, it appears a mechanical quasi-resonance phenomenon with frequencies that depend on the writing speed, manifested by mechanical micro vibrations.

These micro vibrations also propagate in the writing tool body. The more the phenomenon tends to harmonic resonance, the easier the writing process becomes. For example, this phenomenon may be noticed by the specific acoustic sound emitted during the writing process; we can write between "soft" and "scratch" extremes, fact that emphasizes the presence or absence of the mechanical quasi-resonance.

During writing, the mental model of the specific graphic symbols, combined with the hand biomechanical geometry, imposes a momentary variable speed. The effect of this speed variation tends to damp the previously reached quasi-resonance. In this context the action of the synaptic neuromuscular reflex ("Basal Ganglia & Motor Control for JA2084", Malcom Lidierth, November 2004, University of London—Academic Department of Anatomy and Human Sciences JA 2084 Fundamentals of Neuroscience) becomes effective by producing biomechanical micro-actions in the sense of re-entering the quasi-resonance state. This accommodation mechanism unconsciously takes place at any momentary speed variation. The synaptic neuromotor cycle generates the accommodation micro-actions, lasting only few milliseconds. The adjustment loop requires few cycles in order to obtain a momentary quasi-stability; respectively, 20-60 ms. The biomechanics correspondent phenomenon is named force-feedback.

The biomechanical micro actions generated by the synaptic reflex are transmitted to the writing extremity by the pen body, regaining the quasi-resonant micro vibrations necessary for an easy writing. The micro vibrations are transmitted by the constructive pen elements, especially created and positioned for this action and orientedly captured by the two acceleration sensors orthogonally placed in each MEMS module. The biomechanical micro actions are revealed by the other kinetic specific to writing by the micro vibration filtering methods. The valuation of the variability of the micro actions, by algorithmical methods that we shall further on describe, revealed an essential invariants category which generates specific "patterns" for every subject's signature. The invariants are the "pattern" expression for the neuromotor bioelectrical signals of the synaptic reflexes. The pressure is appreciatively derived for the described phenomenon and, therewith, appreciatively integrated through the hysteretic specific to the pressure sensors; therefore, it is not used as principle for this invention.

Along with the described role, the micro vibration's detection is also necessary, as it will be further described in the algorithmic method, to establish the signature's start and finish moments, as well as the pause moments during the signing process. The procedure and the mechanism required for context information analysis are introduced in order to avoid the false start detections. Based on optical type information, it can be detected whether the pen is or not in writing position, thus avoiding the false rendering of accidental vibrations generated by handling the pen foregoing to the signature.

The spatial bio-kinetic pattern is physically sampled by acquiring the accelerations amplitudes which are simultaneously sampled in several points of the writing device main axis, thus facilitating the capture of the balance spatial centripetal components, comparing to the virtual and dynamic center of the balance movements necessary for the writing action. The information digitization is possible with a sample rate high enough to capture the frequencies corresponding to the "acquired reflex" character movements required for the writing activity (2-10 Hz) and therewith to capture the frequencies specific to the local neuropsychomotor cycles —the synaptic reflex (10-50 Hz). Due to the filtering methods of the components corresponding to the vibrations, specific shapes to the synaptic cycles are retained in the digitized signals. The digitized biokinetic pattern will contain composed combinations of invariants specific to the acquired calligraphic gestures and reflexes, invariants specific to the hand's physiology, synaptic reflexes and last, but not least, invariants specific to the personality of the person that performs the signature.

The biometric character of these invariants is a proven fact, as their projection at the paper level represents the entrance information for the graphological expertise. The spatial biokinetic patterns acquisition and analysis and the invariants determined by the biokinetic information combination, generate information sets that allow a much more far-reaching analysis of the signature authenticity, comparing to the classic situation when only a single informational category—classically, the imprints from the paper level—is subjected to analysis. The implicit or refined set of invariants series and the primary or derived set of signals, obtained by methods that will be further described, represent a synthetic decryption of the initial signature informational structure. The accuracy level of the decryption depends on the acquisition subsystem sensitivity and the profoundness of the signals analysis that compose the signature kinetic pattern refining process. The system final answer reflects in the comparison methods accuracy and depends on the signatures stability.

This system's advantages, compared with other authentication methods and systems are:

A close correlation between the person and the analyzed information (the dynamic signature features are characteristic to a certain person and they cannot be easily forged). These features correlate with the free will expression of the person that agrees on something by signature. The fact that the human being does not naturally possess specialized sense organs for the fast dynamic acceleration perception makes difficult any conscious analysis and reproduction in forging purposes, as it is correlated only with the graphical aspect;

The psychological studies show that performing actions immediately perceptible by the subject, among which the signature, represents a natural auto projection mechanism of the individuality regarding the third parties. Therefore, the subject having a correct identity and a real authentication interest, will not consider the system as intrusive;

The handwritten signature authentication method (based on graphic aspect, deducing the writing pressure profile, or the acceleration from the graphic symbols thickness variability) is already used and it is considered less intrusive than other authentication methods (iris scanning, finger prints, DNA test);

The biokinetic information is acquired with a device conceived similarly to an usual pen as shape and size, which includes, along with the kinematic sensorial structures, a microcontroller block for data digitization and transmission to the physic levels that host to the algorithmic processing methods;

The system does not require signing on especially conceived support-devices (the graphic tablet) or intelligent paper with included navigator markers (for example the Anoto Pen). The signature may be performed naturally, on any usual writing document type;

The information input into the system is devised and based on nanotechnology area sensorial systems—MEMS accelerometers—emphasizing their benefits: reliability and sharp accuracy, minimum price and dimensions;

The starting and finishing signature detection method is based on the information corresponding to the contact micro vibrations, analyzed in parallel with the context information;

The system functioning in authentication regime implies activating the initial database required to apply the implementing method and the principle of establishing the category affiliation by the way of differentiation and relating to all the other categories. In this method context, a category is constituted by the specimens of virtual subjects, representative for the targeted orthographical culture;

There are two methods (algorithms) for processing, analyzing and comparing the information: SRA1 and SRA2, independent with respect to one another, by the algorithmic and data pre-processing principles. The results of the two independent methods represent entrances for the final decision method and a feedback for eventual current signature database enrichment and updating. The information represents data structures resulted from composing and pre-processing the spatial kinetic information, the contact information that describes the biomechanical micro-actions generated by the synaptic reflex, and the information that delimits the signature;

The method for adjusting the system confidence level and for diminishing the system answering time which is realized by shifting and implementing the mathematical principles for statistical error control of the quality control area.

The system's answer intrinsically relates to all the signature specimens existing in the current comparison database, by the used analysis and comparison methods. Thus, the principle of establishing a category affiliation by way of differentiation and relation to all other categories, is observed, by comparing the entrance signature with the samples of all the other subjects from the current database, minimizing the system's dependence on the cultural-orthographical specificities of the population for which it is used, respectively. Also, by this method, the disadvantages of the decision based on global or adaptable threshold authenticity evaluation, specific to other domain related inventions, are removed.

BRIEF DESCRIPTION OF THE DRAWING

Further on, the invention will be in detail described, referring also to the figures that represent:

FIG. 1—Physical structure of the authentication system

FIG. 2—Functional structure of the authentication system

FIG. 3—Subsystem 1 topology-writing and kinetic pattern's digital conversion in electronic format (pen)

FIG. 4—Information flow diagram in subsystem 1

FIG. 5—Signature acquisition process diagram by subsystem 2

FIG. 6—Acquisition monitoring interface window

FIG. 7—Data processing diagram by the determination method start-stop

FIG. 8—State machine diagram—The start—stop method

FIG. 9—Subject's system registration stages scenario

FIG. 10—Subject's authentication stages scenario

FIG. 11—SRA1—Signatures conversion and comparison

FIG. 12—SRA1—Invariants definition diagram for n=3

FIG. 13—SRA2—Signatures conversion and comparison

FIG. 14—Filtering method for SRA2

FIG. 15—SRA2—Dividing a signal in sections

DETAILED DESCRIPTION

The system is composed of five information processing subsystems, hierarchically arranged on three physic levels, created to digitize, acquire, process, analyze and authenticate the handwritten signature biokinetic pattern. In FIG. 1 there are presented the functional connections of the subsystems further on described:

Level 1 N1: Corresponds to subsystem 1—S1 and it consists of two indissoluble entities: the writing device and the kinetic computer-based assembly.

Subsystem 1—S1 Functions:

1. The writing device has assimilative functions to an ordinary pen but also the function to transmit the primary information (the signature's kinetic pattern and the context information) to the kinetic computer-based assembly;

2. The kinetic computer-based assembly, placed in the pen, has the following functions: acquisition, digital conversion in electronic format of the kinetic pattern and the context information, encoding it in a specific format and transmitting it to the second Level—N2.

Level 2(N2): "Client Application" is materialized in Subsystem 2—S2 and Subsystem 3—S3 integrated in a personal computer. By its nature, the computer allocates in a sequential or parallel manner the hardware resources to the methods and algorithms implemented in Level 2, thus forming Subsystem 2 and Subsystem 3 that have the following functions:

Subsystem 2—S2 Functions:

1. Acquires the data transmitted by the pen, decoding by channels the kinetic pattern and context information;

2. Determines the signature start and stop moments.

Subsystem 3—S3 Functions:

1. Choosing the work regime: Administrating, Testing, Authentication;

2. Interfacing with the user, specific to the chosen regime;

3. Local administration of the signatures comparison results and of other information transmitted from level 3;

4. Graphical monitoring of the signatures kinetic pattern;

5. Network transmission, to Level 3, of the temporally memorized information.

Within a network, there can be several Level 2 (client) and a single Level 3 (server).

Level 3—N3 is physically materialized by a multiprocessing computer (server) network connected with all the Level 2 subsystems. By its nature, the multiprocessing computer allocates in sequential or parallel manner the hardware resources to the methods and algorithms implemented in Level 3, thus forming Subsystem 4—S4—and Subsystem 5—S5—which have the following functions:

Subsystem 4—S4 Functions:

1. Globally generates and administrates the database: test subjects, real subjects, signatures processed specifically to the comparison algorithms (specimens, accepted originals, rejected originals), matrixes with the comparison results, utilitarian folders;

2. Initiates and administers the specimens updating based on the stored history, by evaluating the validated originals and the preceding specimens based on their distances dispersion. This function is necessary because the signature dynamic features may be influenced by de biophysical and psychical factors and are subjected to changes in time.

Subsystem 5—S5 Functions:
1. Processes the kinetic information taken over from Level 2 by filtering, invariants extraction, weighing, compacting and other specific functions;
2. Contains and effectively runs the dedicated comparison algorithms. Evaluates the result matrixes depending on the commends received from Level 2;
3. Effects the vote between the comparison algorithm's results and takes a decision transmitted to Subsystem 4 for registration and to Level 2 for display.

The functional and physical interconnections between the subsystems/levels are realized by known conversion, transfer, and dynamic physical resources allocation technologies, specific to the computer-based systems. The operating systems, the language platforms used to implement the methods and the BIOS (Basic Input Output Systems) resident in the computers that form the authentication system, realize and administrate these interconnections.

Subsystem 1—S1, the pen, has dimension and functions assimilable to an ordinary pen, plus the necessary elements and functions to capture, digitize the biokinetic pattern and the context information and then, send them to Level 2. The pen shape is given in FIG. 3. It is made of:

1. Metallic case 1 with specific shape, required for a paper quasi-oriented usage, which ensures:
   Assembling support for PCB ("Printed Circuit Board") 2. PCB is part of the kinetic-computer based subsystem components, which will be described at the latter's presentation;
   Electromagnetic screening of the weak electrical signals from the kinetic-computer based system, against external electromagnetic perturbations;
   Specific ergonomics in order to achieve initial quasi-static positioning at the signature start moment, in the domain −0.25 g/+0.25 g of the acceleration sensors, given any orthogonal axis of the writing paper quasi horizontal plane;
   Specific construction to realize, by the tensioned assemblage of the writing refill lead 3, the mechanical transmission path from the micro vibrations generated by the pen lead movement over the paper cellulose micro fibers, to the acceleration sensors, under the influence of the specific hand movements of those who sign. The metallic body writing lead contains, by its specific shape, the guidance channel of the writing refill lead and the window that realizes the IR ("Infra Red") 4 and receiver IR C optical path;
2. The pen refill 3 is an ordinary short refill; the tank is made of plastic and the writing lead is metallic. The lead is mechanically tensioned, installed in the afferent space of the metallic body, supported by the PCB ("Printed Circuit Board") 2, in order to transmit the micro vibrations to the sensors, by the PCB assembly 2. The top of the refill is positioned on the same axis formed by the MEMS sensor modules centers, A and B. At the same time, this axis represents the axis of the metallic body assembly.

The writing paper 5 is an ordinary one. The microscopic subsides of the cellulose fibers have a uniform distribution reported to the surface required to write a character or a graphic symbol. The information contained in the vibration generated by the contact between the pen lead and paper contributes in assembling the signature's biokinetic for the person that uses the pen.

The kinetic computer-based assembly of subsystem 1 is pen embedded and especially created in order to spatially realize, in real time, by means of 5 distinct channels (4 acceleration channels for—ax, ay, bx, by, and a context information channel), the conversion, the acquisition, and the transfer, in real time, to Level 2 of the kinetic and positional context information, with respect to the writing paper. The number of pens S1 in the system may be larger than one and is limited only by the capacity of processing the information from Level 3. A Level 1 subsystem (a pen) functions as unique peripheral of a Level 2 subsystem.

The kinetic computer-based assembly is formed of:
1. PCB—printed circuit board 2—having particular thickness and topology in order to achieve the function of taking over the mechanical micro vibrations generated by the subject interaction with the paper and, the function of optimal transfer of the hand movements spatial variation in order to transmit it to the acceleration sensors.
2. MEMS—acceleration sensors Microsystems A, respectively B Each MEMS microsystem contains two acceleration sensors orthogonally disposed. The acceleration sensors microsystems positioning is created so that it achieves the optimal sensitivity from the point of view of acceleration kinetic centripetal and, translation components acquisition, relatively to the hypothetic movements center and respectively, to the paper plan, and also for the micro-vibrations (contact information) acquisition. The analogical signals generated by the sensors are filtered in order to limit the answer's frequency band at approximately 100 Hz.

3. The IR ("Infra Red") light transmitter 4 sends out a beam with length wave of approximately 800 nm. The beam illuminates in IR the writing paper. The IR light receiver C captures by reflection from paper 5 a quantity of IR light flux proportional to the paper distance and, by means of the analogical comparison instrument from the microcontroller 6, the threshold type evaluation function is accomplished for the distance between the pen lead and the paper.

4. Microcontroller 6 for the acquisition of the information sent by the sensors. The information contained in the biokinetic pattern is captured, digitized and transferred under the control of a typical program (firmware ASM), that administrates the functioning of the main components integrated in the microcontroller:
   Analog-Digital Converter type SAR (Successive-Approximation-Register), 10 bites;
   Analogical Multiplexer;
   RISC (Reduced Instruction Set Computer) type ALU (Arithmetic/Logic Unit), 8 bites/word;
   Memory;
   Analogical Comparator;
   UART (Universal Asynchronous Receiver/Transmitter).

The microcontroller program is created to optimally correspond to the variation interval of the biokinetic neuromotor and physic phenomenon, thus resulting the following general electrical parameters necessary for the acquisition principle:
   There are four acquisition analogical channels for the information provided by the acceleration sensors, placed according to the described topology;
   Sampling frequency on each channel of the analogical information=1000 Samples/Second;
   ADC converter resolution=10 Bits;
   The voltage references are ratio metric;
   The allowed variation interval for the amplitude of the electric signals corresponding to the accelerations, comparing to 0 g=+/−1.5 g;
   ALU clock frequency=8 MHz;
   Number of acquisition channels for the information provided by the threshold distance sensor C, given paper=1;
   Boud Rate UART=115.2 KB.

5. Integrated micro system 7 for converting and transmitting the acquired data to Level 2, in USB format and protocol 6. USB Connection cable 8 for connecting Level 1 to Level 2. A cable connection was chosen for three main reasons: avoiding unauthorized scanning of the information transmitted to Level 2; device retention purpose, in case of public use and; a facile maintenance (excludes the batteries use). The cable thickness (Diam.=2.5 mm) and flexibility (Rc=5 mm) were chosen such that to have a minimum influence on the signature biokinetic pattern.

The spatial acquisition of the biokinetic pattern informational structure and of its variation is realized by capturing the signals of the four inertial MEMS acceleration sensors. The sensors are constructively orthogonally integrated by twos and, placed by PCB 2 topology in two specific locations A and B that coincide on FIG. 3 with the MEMS acceleration sensors A, respectively B. The MEMS group A and the MEMS group B are positioned as follows:

The x sensitivity axis for the A group coincides as sense and direction with the x sensitivity axis for the B group and, the y sensitivity axis for the A group coincides as sense and direction with the y sensitivity axis for the B group, respectively; The x and y accelerometers sensitivity axes correspond to the geometrical axes of their capsule.

The two pairs of MEMS acceleration sensors, A and B, are positioned so that they each have the inertial mass placed on a same common axis with the refill peak;

The Ds distance between A's center and B's center, is larger than 30 mm, in order to emphasize the centripetal components of the spatial movement;

The d distance, between the writing refill's peak and the A group, is smaller than 15 mm, sufficient to distinguish the kinetic information on the paper level;

The MEMS groups A and B are located in parallel planes between them and quasi parallel with the writing paper's plane, to allow the emphasizing, deduction and extraction of the spatial centripetal movement components for the pen axis;

The pen axis intersects the parallel planes determined by the x and y-axes of the A and B groups under a fixed angle $\alpha$ equal to 45°. In a quasi-stationary position, right before starting the signing action, the A and B MEMS modules sensitivity planes are quasi parallel with the paper plan due to the pen oriented shape. Also, due to the same pen oriented shape, it is minimized the pen rotation about its own axis, between distinct signatures. Thus it is ensured a maximum sensor sensitivity for the writing specific movements. When the signing process starts, by writing nature, a momentary medium deviation of the axis appears on any direction, lower than or equal to $+/-a$ $\beta$ angle of 15° given the initial position.

The acceleration momentary variation contains the essential information, therefore different pen positioning, within the limits induced by the oriented type of construction, does not modify the essence of the biokinetic pattern. Grace to the sensor location topology, the acquisition principle and the pen's shape, the eventual different pen positioning are limited as manifestation, without having any effect on the momentary variation but, just as signature global offset. The positioning offset influences the biokinetic pattern less than the natural variability between two signatures of the same subject. The positioning offset represents the effect of the MEMS sensors capability to also take over the static acceleration corresponding to gravitation field, by its projection on that specific direction. The pen instantaneous inclinations, imposed by the interaction between the fixed writing plane and realizing the signature symbols, generates accelerations by dynamic projections of the gravitation field on the sensors axes, intrinsically compounded, in the sensors inertial mass, with the biokinetic accelerations produced by the kinetic mental pattern.

The contact information acquisition, which characterizes the sequences of the invariants contained in the synaptic reflex, is ensured by the pen elements construction, thus:

The d distance is lower than 15 mm between the pen lead peak and the MEMS group A, sufficient to emphasize the contact information at the paper level.

The PCB 2 (Printed Circuit Board) thickness is lower than 0.5 mm, said small thickness being necessary to ensure, by flexibility and elasticity, the mechanical way for transmitting to the MEMS sensors the vibrations that characterize the synaptic reflex.

The kinetic computer-based assembly mass is less than 25 grams in order to minimize the negative inertial effects in transmitting the micro vibrations to the MEMS sensors.

The pen lead 3 is positioned in mechanical contact with the PCB and strained between the pen peak and PCB 2. The refill reservoir allows the transmission of the specific frequency band of the contact micro vibrations that characterize the synaptic reflex.

The fastening of the kinetic computer based assembly in the metallic case is realized by elastic support in four fixed points, to ensure the specific frequency band transmission of the contact micro vibrations by PCB 2 to the MEMS sensors. The fixed support points are PCB protuberances, realized by cutting. Their disposal on the PCB is: symmetrical, in twos on each long side. The disposal on each side is: the first point from the pen lead—at the half of the Ds distance and, the second support point is at a Ds distance from the position of the first point, to the pen wired end.

The signature biokinetic pattern is obtained by digital signal acquisition, representing:

The intrinsic accelerations composition corresponding to the three following categories: a) those produced by the mental kinetic pattern, b) those produced by micro vibrations modulated by the synaptic reflex pattern (contact information), c) those produced by dynamic projections of the gravitational field on the sensors axes. The intrinsic composition of these acceleration categories takes place for each of the four sensors, generating complex pattern sequences.

The set of four composed accelerations captured by the sensors specific spatial positioning so that to resume the movements spatial kinetic from the start to the finish moments of the signature, also including the movements when the pen does not touch the paper.

Context information captured by the IR sensor C.

By means of an USB driver 9, subsystem 2 (S2) acquires the data from level 1 by means of block 10. The data are decoded 11 and then temporarily stored in a circular buffer 12. The signature start and stop moments are detected by an analysis (further named start-stop analysis) 13 of the data stored in the circular buffer. The graphic monitoring of the acquired data, the acquisition errors and the start-stop analysis results are realized by a specific graphic interface 14. When a valid stop is detected, the acquisition automatically stops, the acquired signature is temporary saved in block 15 and displayed by means of the graphic interface 16. The current signature monitoring interface window is presented in FIG. 6, containing the following significant elements:

- Information referring to the current subject and the current acquisition folder 17;
- State indicators 18 of the current acquisition;
- Monitoring window 19 of the sensor group A;
- Signaling the presence of the contact information 20;
- Graphical representing 21 of the accelerations on the x and y axes of the MEMS group A;
- Monitoring window 22 for the sensor group B;
- Signaling the presence of the context information 23;
- Graphical representing 24 of the accelerations on the x and y of the MEMS group B;
- Control commands and current acquisition administration commands 25;

In order to eliminate any possible external perturbations, after the system user validates the signature acquisition, it is sent to level 3 for analysis.

The determination method of the intervals in which subsystem 1 moves, in contact with the paper—the start-stop method—consists in evaluating, according to a genuine procedure, the combination between the contact information determined by analyzing the decoded primary signals obtained from subsystem 1 (signals $a_x$ and $a_y$) and the context information (distance to the paper). The pen movement in contact with the paper generates the apparition within the acquired signals of some components with a much higher frequency than the frequencies specific to the writing movement. These components, determined by the microscopic paper asperities, emphasized by the sensors sensitivity and the pen sampling rate are stronger in the signals obtained from the A sensor (due to a shorter distance to the paper). For precise detection of the paper contact, these components must be separated from the ones generated by the random perturbations of the analog signals. Within the same signature there can be emphasized several start-stop intervals, which identify the intervals within signature when the pen is in contact with the paper. Determining the start and the stop of the whole signature is realized by a global analysis of the acquired signals and the detected start-stop intervals. The method has two major components: data processing component and the start-stop moment detection component.

The data received from the MEMS sensors A is processed as in FIG. 7. Each sample group ($a_x$ and $a_y$ signal samples) is stored in a circular buffer named primary data buffer 26. To start the primary data analysis, the buffer must accumulate a minimum number of samples group (the equivalent of approximately 0.5 sec) 27. The primary data is processed in real time on two planes. This processing takes place for each sample group of the signals received from the pen.

a) Contact information analysis:

Signal filtering from the primary data buffer 28—the $a_x$ and $a_y$ signals stored in the primary data buffer are filtered with a high-pass filter FFT type thus obtaining two signals representing the contact information ($i_1$ and $i_2$);

Contact information analysis 30—the statistical variance is calculated on each of the two signals formerly generated, on the last 20 samples (experimentally determined value);

Saving contact information level 31—the values of the variance formerly calculated are saved, corresponding to the current sample group, in a variance level analyzer circular buffer.

b) Context information analysis:

Pen detection in writing position 29;

Data saving in the pen position analyzer circular buffer 32.

The dimensions of the variation analyzer circular buffer and the pen position analyzer circular buffer are experimentally determined.

The start—stop moments detection is made conformal to the diagram represented in FIG. 8, which describes the implementing of a state machine.

State describing:

a) Acquisition N samples 33—accumulates, in order to analyze the contact information, the N samples (the N value is influenced by the start-stop parameters experimentally determined). The transition from this state to the start moment evaluation state takes place after acquiring N primary data samples.

b) The start moment evaluation 34—is performed by evaluating the variance level analyzer circular buffer and the pen position analyzer circular buffer. The start detection is conditioned by:

The variance level, on the $i_1$ signal or the signal $i_2$, must be higher than a pre-established level (named contact information threshold level) on a minimum sample number (named minimum contact points number) from the variance level analyzer circular buffer.

The pen must be in writing position on a certain minimum number of points (named minimum number of points in writing position) from the pen position analyzer circular buffer.

The transition to the next phase is realized at start detection.

c) Stop moment evaluation 35—is performed by evaluating the contact information analyzer buffer and the pen position analyzer circular buffer. We verify whether the variance level, on the $i_1$ signal or the $i_2$ signal, is lower than a pre established level (contact information threshold level) on a certain minimum number of points from the analysis buffer (minimum non-contact points number) or if the pen is not on writing position on a certain minimum number of points (named minimum number of points in writing position) from the pen position analyzer circular buffer.

The transition to the next phase is realized at stop detection. The determined stop moment is an internal stop moment that determines one of the intervals when the pen is in contact with the paper.

d) Internal start moment evaluation 36—is identical with the start moment evaluation but on other parameters (contact information threshold level, minimum contact points number, minimum number of points in writing position). Considering that during the signature process, there can be several moments when the pen is not in contact with the paper, it is verified whether the formerly determined stop is a final stop or just an internal stop (which defines one of the intervals when the pen is in contact with the paper). If in an experimentally determined period (based on measuring the maximum time during signature when the pen is lifted up) an internal start is not detected, the formerly detected stop is considered the final signature stop.

The transition to the next phases is realized after a minimum latency (the length of the time period previously mentioned) or after internal start detection.

e) Stop validation 37—the acquired signature must have a minimum samples number; otherwise the process is restarted from the start moment evaluation transition. The minimum samples number is experimentally determined and introduced in order to avoid the detection of accidental pen and paper contacts.

f) Signature saving 38—saving the acquired signature

Subsystem 3—S3 is responsible of user interface, local signature administration, signature result comparison and other information from level 3 administration and also ensures communication with level 3 (settings, signatures sending etc.)

To each 2-3 subsystem assembly of level 2 corresponds a single Level 1 subsystem.

Subsystem 4—S4, of level 3, generates and administrates the database: test subjects, real subjects, signatures processed specifically to the comparison methods (specimens, accepted originals, rejected originals etc.), evidence with the authentication results, utilitarian folders. The subsystem is responsible for saving a subject's identification data and specimens, the latter being introduced in the system during the subject registration process FIG. 9. A subject specimen number from the system database (spec. no.) is an experimentally determined parameter that influences the original recognition level, the forged signature rejection level, and the authentication time. To prevent "altered" signatures to enter the system as specimens (acquisition errors, signatures influenced by various external elements, etc) it has been implemented a method for analyzing and certifying the acquired signatures during the subject registration process. After introducing the subject data, N subject signatures, are acquired. These will be analyzed in order to establish the signature group dispersion (the dispersion is calculated based on the recognition method SRA1). From the N signatures, there will be saved the first spec. no signatures from the dispersion point of view, which will be converted in the specific formats of the recognition methods and saved as specimens in the system database.

This subsystem implements also a specimen updating method, which determines the signature changes, determined by biophysical and psychical factors that occur on long periods. The specimens are updated based on the originals entered in the authentication process and recognized by the system as belonging to the subject. This method analyzes the originals and the specimens stored in the database and, according to their relative dispersion, replace the specimens with the first n analyzed signatures. This mechanism initiates when the database accumulates a minimum originals number in order that the analysis be conclusive and prevent the alterations induced by some inconclusive originals.

Subsystem 5 processes the signatures from level 2, determines the subjects set (the set size is the optimum subject number No) whose signatures will be compared with (by randomly choosing subjects from the database), converts the signatures in specific formats of the recognition methods and runs the implementations of these methods (FIG. 10). The final authentication result is obtained by combining and interpreting the results of the different recognition methods and sent to level 2. The subsystem is also responsible with the signatures comparison introduced in the subject registration process within the system (FIG. 9)

This subsystem has an open architecture, allowing new signature recognition methods to be implemented.

The SRA1 contains two modules:

a) Entry data processing module. Representative information is extracted from the entrance data, by a series of operations, and the information is used to store data regarding the specimen signatures and represent the data constituted by the entrance signatures (original or forged) that are to be recognized. This operations assembly is called the Signature Conversion Method 39.

b) Specimen and entrance signature comparison module

This operations assembly is called The Signature Comparison Method 40.

The assembly formed by The Signature Conversion Method and The Signature Comparison Method is named The Signature Recognition Method SRA1 (Signature Recognition Algorithm 1).

The specimen signatures are converted and deposited in the signature database. Subsequently, when an entrance signature appears (original or forged), this is converted and compared with the signatures from the database, calculating the distance between the entrance signature and the specimen signatures and thus determining whether the entrance signature subject is the same with the specimen signature subject.

The entrance signal conversion in a format that can be later used in the comparison process encloses the following stages:
a) Transforming the entrance signals in signature components.
b) Converting the signature components in invariants.
c) Compressing and weighing the invariant sequences.

In the S1 pen that generates the signals, exist two modules of acceleration sensors, A and B, located according to the Subsystem 1 description. During a signature, each module generates two signals (acceleration projections on two coordinate axes x and y). Therefore, the next entrance signals result:

$a_x$: signal generated by MEMS A on the x direction of the A point
$a_y$: signal generated by MEMS A on the y direction of the A point
$b_x$: signal generated by MEMS B on the x direction of the B point
$b_y$: signal generated by MEMS B on the y direction of the B point Each signal is in fact a samples vector represented as positive integer numbers. The vector is a numerical representation of a waveform. All the vectors of the same signature have the same length (same samples number).

From each $a_x$, $a_y$, $b_x$, $b_y$ entrance signal group are obtained the following components:

$c_0 = a_x$
$c_1 = a_y$
$c_2 = b_x$
$c_3 = b_y$
$c_4 = FFTF(a_x) - FFTF(b_x)$
$c_5 = FFTF(a_y) - FFTF(b_y)$
$c_6 = a_x/b_x$
$c_7 = a_y/b_y$ $$c_8 = \sqrt{a_x^2 + a_y^2} / \sqrt{b_x^2 + b_y^2}$$

Therewith, each component is a vector with the same length as the entrance signals. FFTF (x) equals filtering by Fast Fourier Transform—direct and inverse of the x signal. The filter is a low pass filter. The filtering coefficient is experimentally determined and is characteristic to the physic pen.

Analyzing the samples components sequences are determined the invariants that compose these components. By invariants, there are understood herein elements of the waveforms that are invariant reported to the signal amplitude and frequency. If the signal has the L length, the invariants are determined by analyzing groups of n consecutive points, starting with each signal point (except, of course, the latest, L−ENT(L/n)*n points where ENT(L/n) represents the whole part of L/n).

The invariants may be defined in many ways. N−1 line segments are defined with n points. Herein there are chosen n=3. Let $p_0$, $p_1$ be the slopes of the two line segments. There are defined the following m=13 invariants types (FIG. 11) to whom there are associated code between 0 and m−1:

$code_0=0: p_0>0, p_1>p_0$
$code_1=1: p_0>0, p_1=p_0$
$code_2=2: p_0>0, p_1<p_0, p1>0$
$code_3=3: p_0>0, p1=0$
$code_4=4: p_0>0, p1<0$
$code_5=5: p_0=0, p_1>p_0$
$code_6=6: p_0=0, p_1=p_0$
$code_7=7: p_0=0, p_1<p_0$
$code_8=8: p_0<0, p_1>0$
$code_9=9: p_0<0, p_1=0$
$code_{10}=10: p_0<0, p_1<0, p_1>p_0$
$code_{11}=11: p_0<0, p_1=p_0$
$code_{12}=12: p_0<0, p_1<p_0$ These invariant types codes will be called base types/codes. It is noticed that, indeed, these invariants do not depend on the signal frequency and amplitude. If a signal will be amplified twice, for example, or diminished its frequency, two times, there will be obtained the same invariants sequences.

It can also be noticed that not every invariant sequence is possible. For example, after a 0 type invariant, there may follow only invariants of the 0, 1, 2, 3, 4 type.

Determining the invariants, every component may be transformed in triplet sequences ($inv_i$, $ar_i$, $tr_i$) that contain:

The invariant basic type $inv_i$.

Reference amplitude $ar_i$ of the invariant. The reference amplitude may be defined in several ways. Herein it is considered as reference amplitude the amplitude of the first sample from the n on which the invariant is defined.

The reference moment $tr_i$ of the invariant. The invariant reference moment may be defined in several ways. Herein it is considered as reference moment the appearance moment of the first test sample (from the n on which the invariant is defined), given the wave start.

In order to make a description close to a wave shape, it is compared the reference amplitude of each $ar_i$ invariant of the wave to $ar_k$ reference amplitude of the first anterior invariant of the same basic type: tip($ar_i$)=tip($ar_k$)=$b_i$. (If there is no anterior invariant of the same type it is considered that $ar_k=ar_i$) There are 3 situations:

a) $ar_i<ar_k$ In this case the i invariant has the $b_i$ code
b) $ar_i=ar_k$ In this case the i invariant has the $b_i$+m code
c) $ar_i>ar_k$ In this case the i invariant has the $b_i$+2*m code By this operation, each component is represented as a code succession named extended codes (or extended types) having values between 0 and 3*m−1.

It may be noticed that the base code may be deduced from the extended code.

In addition, it is noticed that not every consecutive extended invariants sequence is possible. For example, if three consecutive invariants have the same base code (let it be 0), it is not possible for the second to have the reference amplitude higher than the first and, the third lower than the second, etc.

The next stage in processing the waves represented by invariants sequences encoded with extended codes consists in compressing and weighing the invariants sequences. Essentially, compressing consists in keeping a single invariant of a certain type out of an invariant sequence of this type. Weighing consists in attaching on every invariant a weight (or cost) that depends on several elements, as it can be further seen.

The compressing and weighing method contains the following steps:

a) An invariant section chart is determined. Each entry in the sections chart corresponds to a sequence of one or more consecutive invariants with the same base type, and contains:

The section extended type, which is the extended type of the invariants that compose the section.

The section reference amplitude may be defined in several ways. The reference amplitude is considered as being the sum of the reference amplitudes of the invariants that compose the section.

The section reference moment may be defined in several ways. The reference moment is considered to be the sum of the reference moments of the invariants that compose the section. (Observation: this will lead to a larger weight of the invariants positioned to the end of the signature, which concords to the experimental results!).

b) The section chart is sorted using as key the base types extracted from the sections extended types.

c) The section chart is divided in subsections with the same base code.

d) The entrance number in the section chart determines the length of each subsection.

e) For each subsection, it is obtained the average of the reference amplitudes of the subsection elements (the sum of the subsection elements reference amplitude divided to the subsection length).

f) For each subsection, it is obtained the average of the elements reference moments (the sum of the subsection elements reference moments divided to the subsection length).

g) The reference amplitude of each subsection element is replaced with the subsection elements average reference amplitude.

h) The reference moment of each subsection element is replaced with the subsection elements average reference moment.

i) The section chart is sorted in the initial order. At this moment, each element of the sections chart will contain modified reference amplitude and a modified reference moment.

j) It is generated another invariants sequence in doublet ($inv_i$, $cost_i$) that contain, for each entrance in the sections chart:

The extended type of the invariant $inv_i$ (equal to the extended type of the section element).

The weight (cost) $cost_i$ equal to the sum of the reference moment and the reference amplitude of the section element.

k) The invariants weights from the obtained sequence are adjusted according to an adjusting curve (function). This curve function may be defined in many ways. If at this moment the length (in invariants number) of the component wave is L, then it is considered that said curve is thus defined:

The first L/4 invariants have the weight multiplied by 0.5.
The next L/2 invariants have the weight multiplied by 1.
The rest of the invariants have the weight multiplied by 1.5.

The signature comparison module realizes the comparison between two signatures. In order to compare the two signatures, for each signature is available a component set. Each component is an invariant succession. Each invariant has associated the following information: the extended code (of which may be eventually deduced the base code) and the weight (cost) of the invariant.

In order to calculate the distance between two components is used the Levenshtein distance (Christian Charras, Thierry Lecroq: Sequence comparison, LIR (Laboratoire d'Informatique de Rouen) et ABISS (Atelier Biologic Informatique Statistique Socio-linguistique) Faculté des Sciences et des Techniques Université de Rouen 76821 Mont-Saint-Aignan Cedex France) with the next explanations:

a) The type of symbols compared according to the Levenshtein distance will be the extended invariants codes.

b) The symbol costs are the invariant weights (costs)

c) When (according to the Levenshtein distance) two identical as type symbols are compared, the resulted cost equals the module of the two symbols costs difference.

d) When (according to the Levenshtein distance) two different as type symbols are compared, the resulted cost equals:
  i. If it regards a deletion, the resulted cost is the deleted symbol cost.
  ii. If it regards an insertion, the resulted cost is the inserted symbol cost.
  iii. If it regards a substitution, the resulted cost is two symbols cost sum.

e) Finally, if the result (the Levenshtein distance) is D, the distance taken into consideration (normalized) d will be:

$$d = 1 - \frac{D}{\sum_i cost_i + \sum_j cost_j}$$

Where $cost_i$ and $cost_j$ represent the costs of the two components invariants.

From the comparison of the m components of a specimen signature SA with respectively the m components of an entrance signature SB result m distances. There are several ways to combine the m distances. It is considered that the final distance $d_{SRA1}$ is the average of the m distances:

$$d_{SRA1}(Sa, Sb) = \frac{\sum_{i=1}^{m} di}{m}$$

The SRA2 method contains four modules:

a) Filtering module for entrance signatures

The entrance data contains two types of information with different frequency specters: the pen lead with the paper contact information and the complex hand movement information. From this information is mainly retained for ulterior processing the information regarding the hand spatial movement. The information regarding the micro vibrations generated by the paper contact is selectively diminished in order to retain the information corresponding to the synaptic reflex pattern. This procedure will be called Filtering method 41.

b) The post-processing and entrance data composition module

By a series of operations, from the filtered entrance data is extracted representative information, used to store the data regarding the sample signatures and to represent the data constituted by the original or forged signatures that are to be recognized. The assembly of these operations shall be named Post Processing and Signal Composition Method 42.

c) The module for comparing two signals, one specimen and another, an original or a forgery.

The assembly of these operations shall be named The Signal Comparison Method 43.

d) The signature distance determination module, based on the component weight. The assembly of these operations shall be named The Signature Distance Determination Module, Based on the Component Weight Factors 44.

The assembly formed of the Filtering Method, Post Processing and Signal Composition Method, The Signature Distance Determination Module, Based on the Component Weight Factors and The Signal Comparison Method will be named The Signature Recognition Method SRA2 (Signature Recognition 2).

The combining mode of Filtering Method, Post Processing and Signal Composition Method, The Signature Distance Determination Module, Based on the Component Weight Factors and The Signal Comparison Method is presented in FIG. 13. The sample signatures are converted and stored in the signatures database.

Subsequently, when a new signature is put in an appearance, SRA2 converts and compares it with the database signatures, calculating the distances between the entrance signature and the specimen signatures of all the other subjects from the current comparison database. Based on the result distances is determined the relational data vector of the entrance signature compared to the sample signatures of all the other subjects, including the targeted subject. This data vector, together with the one corresponding to the same entrance generated by SRA1, constitutes the entrance information for the result combining method.

The filtering module (FIG. 14) is constituted by the software implementation of a filter, created on the EMD principle (Empirical Mode Decomposition), to optimally separate the kinetic pattern transmitted from Level 1 by the quasi resonant micro vibrations in amplitude and frequency modulated carrier, by the action of the synaptic reflexes. The variation of the momentary writing speed produces micro vibration frequency modulation, and the intensity variation of the neuro-motor synaptic actions produces the amplitude modulation.

The method applies to each of the four signals, representing the accelerations ($a_x$, $a_y$, $b_x$, $b_y$)

The base function used in the filtering algorithm is to calculate the gradient:

$$slope(x, y) = \frac{n\sum xy - (\sum x)(\sum y)}{n\sum x^2 - (\sum x)^2}$$

which applies on the intervals and steps defined below.

It is noted as $V(1 \ldots n)_1$ the initial series composed of n numerical elements, expressing the values of the analogical signal samples provided by the pen, which will be filtered.

The filter consists in performing multiple times the procedure formed of the following steps (resulting from the entrance series V, exit series W):

Step 1: $W1_j = V1_j$.

Step 2: $C1 = slope([Vi-1_j, Vi_j], [i-1, i])$ $C2 = slope([Vi-1_j, Vi_j, Vi+1_j], [i-1, i, i+1])$ $Wi_j = S = Vi_j - C1*k1 + C2*k2$, $i=2 \ldots n-1$ (k1 and k2 are experimentally determined constants, with 0.935, respectively 0.93 values)

Resulting to these calculations W has n−1 elements.

Step 3: $Vi_{j+1} = Wi_j$, $i=1 \ldots n-j$, $j=1 \ldots N$, $N=2*Z$, $Z>0$, integer The procedure repeats N times.

The N number determines the high frequencies attenuation, corresponding to the micro vibrations. The filter is optimized for a ratio comprised in the domain 1:4–1:10, between the useful and attenuated frequencies experimentally resulting the optimal value N=10.

After filtering, the resulted signals represent the composition of the hand spatial movements with the movement pattern caused by the synaptic reflex action. The principle is specific to the biosignal processing, intrinsically modulated AM-FM, named EMD ("Empirical Mode Decomposition—The University of Birmingham School of Computer Science—MSc in Advanced Computer Science—EEG-Handbook 2004/2005", "DETRENDING AND DENOISING WITH EMPIRICAL MODE DECOMPOSITIONS"—Patrick Flandrin, Paulo Gonc alv'es and Gabriel Rilling-Laboratoire de Physique (UMR 5672 CNRS), Ecole Normale Superieure de Lyon).

From each filtered entrance signals group $a_x$, $a_y$, $b_x$, $b_y$, there are obtained the following components within the Signals Composition and Post-Processing Module 42:

$$c_0 = \sqrt{a_x^2 + a_y^2} -$$

- momentary acceleration module in point A;

$$c_1 = \sqrt{b_x^2 + b_y^2} -$$

- momentary acceleration module in point B;

$c_2 = v_1$-momentary speed module in point A, obtained by $c_0$ integral;

$c_3 = v_2$-momentary speed module in point B, obtained by $c_1$ integral;

$c_4 = c_0 - c_1$-eliminating the pen translation acceleration, keeping only the centripetal component;

$c_5 = v_1 - v_2$-eliminating the pen translation speed, keeping only the centripetal component;

Therefore, each component is a vector with the same length as the entrance signals and will be considered a signal derived from the entrance signals.

The first comparison phase is dividing the signal in sections, on the below criteria:

Mark the signals resulted from the Signals Composition and Post-Processing Module, from both signatures (specimen and original or forged entrance), on the extreme signal points (local maximum and minimum). Create sections composed of value series comprised in 4 markers. Step to the next marker and repeat procedure (as represented in FIG. 15).

To calculate the distance between 2 signals corresponding to the entrance and specimen signatures, is used an algorithm type DTW (Dynamic Time Warping), with the explanations below:

a) The algorithm applies on the sections formed on values comprised between 4 markers.

b) As distance evaluation function between two sections, we use the F-Test function, which returns the probability for two series to be identical. (Kishore Bubna Charles V. Stewart Department of Computer Science, Rensselaer Polytechnic Institute Troy, N.Y. 12180-3590 "Model Selection Techniques and Merging Rules for Range Data Segmentation Algorithms")

In the next chart, on the rows are positioned sections generated by the Q signal, and on the columns are positioned sections generated by the W signal.

| | P Seg W[0] | P Seg W[1] | P Seg W[2] | P Seg W[3] | P Seg W[4] | P Seg W[5] | P Seg W[6] |
|---|---|---|---|---|---|---|---|
| P seg Q[0] | | | | | | | |
| P seg Q[1] | | | | | | | |
| P seg Q[2] | | | | | | | |
| P seg Q[3] | | | | | D (i-1,j-1) | D (i-1,j) | |
| P seg Q[4] | | | | | D (i,j-1) | D (i,j) | |
| P seg Q[5] | | | | | | | |
| P seg Q[6] | | | | | | | |
| P seg Q[7] | | | | | | | D |

$$D(i,j) = \min\{D(i-1,j-1), D(i-1,j), D(i,j-1)\} + d(q_i, w_j)$$

$$d(q_i, w_j) = \frac{|n_i - n_j|}{\max(n_i, n_j)} * \frac{|ave_i - ave_j|}{\max(ave_i, ave_j)} * (1 - ftest(q_i, w_j))$$

Where: $q_i$—section of i class from signal 1(Q);
$W_j$—section of j class from signal 2(W);
$n_i$—length of section $q_i$;
$n_j$—length of section $w_j$;
$ave_i$—medium square deviation of section $q_i$;
$ave_j$—medium square deviation of section $w_j$.

c) Finally, if the distance calculated by the algorithm is $D_{qw}$, then the distance taken into consideration as being D distance between signatures will be $$D = 1 - \frac{D_{qw}}{\min(N_q, N_w)}$$

Where: $N_q$—sections number in Q signal
$N_w$—sections number in W signal.

Because $\min(N_q, N_w)$ may be smaller than $D_{qw}$ there is the probability for D to be smaller than 0. Therefore appears the necessity to rate-set the obtained result, for comprising it in the [0 . . . 1] interval. This rate setting is based on experimentally obtained data and on the formula below:

$$D_n = \frac{D - V_{min}}{1 - V_{min}}, V_{min} < 0$$

Where $V_{min}$ represents the minimum possible D value, experimentally determined.

Each signature component is associated with a weight, experimentally determined on a large database within the signature distance determining module, based on components weight factors 43.

Comparing the N components of a specimen signature SA with respectively the N components of an entrance signature SB (original or forgery) result N distances. There are multiple ways to combine the N distances. It will be considered that the final distance $D_{SRA2}$ is the weight average of the N distances:

$$D_{SRA2}(S_A, S_B) = \frac{\sum_{1}^{N} p_i * d_i}{\sum_{1}^{N} p_i}$$

Where:
N—number of component signals of a signature;
$p_i$—component I weight;
$d_i$—distance between the component signals $S_A(i)$ and $S_B(i)$.

The two results matrixes (row), obtained by SRA1 and SRA2, after comparing the entrance signature with the current comparison database, are totalized generating thus the matrix of the final results. The final results matrix is decreasingly sorted. The final answer of the authentication process is composed of the positions on which we find the results of the comparison between the entrance signature and the corresponding specimens. Based on the final answer and the allowable risk coefficient, the system will decide to accept the signature as original or reject it, as forgery (ex: for a system with a low allowable risk coefficient, the signature is considered accepted as original if, in the final answer, there also exists the first position—which corresponds to a minimum distance between the entrance signature and one of corresponding specimens).

In order to evaluate the algorithms performances there will be introduced several indicators:

If it is noted as:
NOA=Number of accepted originals;
NFR=Number of rejected forgeries;
NS=Number of specimens;
NF=Number of forged signatures;
NO=Number of originals;
K=Number of subject specimens;
N=Number of subjects.

Then the following indicators will mostly reveal the system performances:

a) System success rate in treating the originals (RSSO)
RSSO=NOA/NO
b) System success rate in treating the forgeries (RSSF)
RSSF=NFR/NF
c) System success rate (RSS) RSS=(NOA+NFR)/(NO+NF)

The indicators are obtained with reference to the database, which contains a number of N subjects, each having registered a number of K signature specimens (NS=N*K). A high system performance is characterized by maximum values of the three indicators.

The performance evaluation is realized by experimenting on subject sets whose size and importance are chosen according to the application domain and the allowable risk coefficients for said domain. For the performance regarding the forged signatures, the system is tested with a number of forged signatures comparable to the number of original signatures.

As the above-mentioned indicators cannot practically reach the ideal values of 100%, the authentication system described represents one of the links (parallel or serial integrated) in the chain of person authentication procedures and systems. The described system realizes automatically and much more objectively the signature checking procedure. This procedure is usually difficult and many times only formally approached by a person without the graphological expertise certificates that should be required, such as a bank operator, a registrar, or the cashier at card-shopping places.

One of the principles of the described authentication method is: the entrance signature relationed to a specimens group belonging to several subjects, including the specimens of the targeted subject. All the specimens are compared with the entrance signature. Therefore it is required the pre-existence of an initial database, to make possible the system functioning when the first real subject is registered. The initial database contains virtual subjects specimens, which hold as common feature the fact that they belong to the same orthographical culture (alphabet) of the cultural space in which the application is functioning. As the authentication system is used, the new subjects' specimens are registered in the initial database, thus generating the current database. This way, the subjects number from the current database can reach values of tens or hundred thousands.

If the current database had large dimensions, comparing and relating the entrance signature would last long enough for the answering time to become inefficient. At the same time, the complexity of the decision method would grow, due to the randomly generated resemblances, for some signatures, by the large number of subjects registered in the database. By repeated experiments, it has been proven that the unwanted resemblances, detected by the algorithms run in the entire database, are less than the required number to alter the (imposed) system success rate (RSS). Therefore, adapting and implementing the specific techniques from the statistic control field to the general method of the authentication system solve the database dimension problem.

The relation described above is based on a subjects set, also including the targeted subject. Consequently, to the experiments and the repeated analysis of the comparison methods in the total database, formed of free-will expressed signatures, we have determined the following statements:

1. There is a reciprocal interdependence between: the system success rate (RSS), the number of subjects from the initial database (N), a subject samples number (K), size of the subjects set ($N_e$) and the entrance signatures number ($N_i$).

2. Of course, with the exception of the comparison between signatures of the same subject, experiments have shown that the distribution of all the values (distances) regarding the comparison of the results for the entire database of specimens and originals, with the present invention comparison method, is a normal type distribution (Gaussian) for any subject. Concordant to the System Success Rate (RSS), the answer value (distance) when comparing the original with one of its samples represents the maximum point on the distances distribution curve obtained by comparing an entrance with the entire specimens database.

3. On all the distribution curves of all the sorted answer values of any subject, corresponding to the $N_i$ original entrance signature of the subject, the value coordinates for the other subjects answers are quasi constant in the maximum area and determine specific arrangements for each subject analyzed by the comparison answer value criteria. As in the real system the database is not stable (the subjects number is in continuous evolution), this last conclusion is exploited in subsystem 5 (decisional) exclusively regarding the stable identity signatures from the set, the conclusion being relevant for explaining the method.

4. There always exists, in the initial database formed on the cultural affiliation criteria, a number of subjects fulfilling the criteria of having relatively uniform distributed answers on the distribution curves of the answering sorted values of the other subjects from the initial database. The relative order and the apparition area of these subjects on the distribution curves, especially for the values close to the maximum point of the distribution curve, characterize the answering behavior of the entrance signature regarding the specimens of the subject to whom they are compared. If the specimens of these virtual subjects are introduced, at the same time with the targeted subject's samples, in the current comparison database, with the sorted specimens from the current database, we have the possibility to supplementary refine the authentication decision.

Exploiting these experimental conclusion and interdependence statistical relations is made in order to minimize the answering time, mapping the authentication system's characteristics on the classic parameters of the standard control charts of the batches that define the interdependence between the error control parameters from the normal dispersion batches. Mapping main purpose is to properly dimension the subject set correlated with RSS.

Mapping between the notions specific to the sampling statistic control charts and the ones used in the authentication system are defined as below:

The objects introduced in the "production process" assimilate with the signatures;

The stable process that produces the attribute which represents the control criteria assimilates with the comparison between two signatures by the SRA1 and SRA2 methods;

The Etalon is the value of any of attributes generated by the comparison methods SRA1 and SRA2 applied between the entrance signature, with known provenience and that subject specimens. The etalon is specific to each authentication action, as it depends on the entrance signature;

An authentication action generates a batch when it is applied on the whole database. The batch size assimilates to the current database;

The sample set size assimilates to the number of signatures randomly picked from the current database plus the targeted subject specimens and together they form the current comparison database;

The error assimilates to the incorrect answer of the decision method regarding the original and forged signatures when, if the system is tested by repeated comparisons in the current comparison database, the entrance signature provenience is known;

AQL assimilates to the level of confidence in the sampling method.

Dimensioning the size of the subjects sample is realized considering the initial database permanently numerically equal to the current database, having the RSS experimentally determined on the whole database by means of the two specific indicators: RSSO and RSSF, experimentally determined by the separation properties of the comparison methods.

For example, from the normal statistical control chart (SR 3160/2–84), we choose the condition for the easiest evaluation: the decision method evaluates the error existence by analyzing the affiliation of the rank 1 subject (maximum resemblance) to the correct category (original or forgery) based on the specimens answer from the current database by comparison with current entrance. If the experimentally determined RSS on a 1200 specimens database belonging to 240 subjects, evaluating for a single entrance ($N_i$=1), is of 97% and the target confidence level is of 99.9% after sampling, there is obtained from the control chart a sample set size of 125 specimen signatures corresponding to $N_e$=25 subjects. In the same time, considering the effect of the AQL value, RSS becomes in the worst case $RSS_{initial} \times AQL$, respectively 96.903%. Thus, the system answering time improves more than 10 times with an RSS decrease of only 0.097%.

The experiments have emphasized the fact that for $N_i$=2, RSS increases with a value equal to approximately half of the necessary percents for obtaining the ideal situation (100%), respectively from 97% to approximately 98.5%, and after sampling results $RSS_{(Ni=2, Ne=25)}$=98.303%. The system answering time thus improves more than 5 times.

RSSF is directly proportional with the number of subjects from the sampling set. The random attractors contained by the specimen signatures of these subjects produce the phenomenon. On the edge, supposing that the samples set would be formed only from a randomly chosen subject specimens plus the specimens of the targeted subject, there is a high probability for the forged signature to be authenticated, as the specimen signatures have a high chance to contain stronger attractors for the forged signature than the other subject specimens.

It is formally introduced the notion of method (algorithm) of comparison with null separation power for which the separation power equals the randomly choise probability of any signature from the current database. Using such algorithm, the system success rate is:

$$RSS_o = 1/n$$

wherein n is the signatures number from the database ($RSS_o$ for a database of 2000 signatures would equal 0.0005 respectively 0.05%)

As RSS is experimentally determined on the whole initial database (for example 97% for a database of 2000 signatures), the recognition power of the methods ($P_{SRA1}$, $P_{SRA2}$) used by the system may be defined as the report $RSS/RSS_o$.

The sample set size ($N_e$) is chosen according to the statistic control chart, also simultaneously fulfilling the next two conditions:

Condition 1: In order to optimize the sample set from the RSSO point of view, the size of the signatures number from the chosen sample set must generate an $RSS_o$ answer much lower than one minus the system measured success rate for an authentic signature (RSSO)

$$RSS_o \ll (1-RSSO)$$

Condition 2: In order to optimize the sample set from the RSSF point of view, size of the signatures number from the chosen sample set must generate a high rate of spontaneous false recognition ($RRIF_{(x)}$) with a random signature (x), from the sample set, due to the attractors contained by random signatures from the sample set. The signature (x) is not one of the targeted subject specimens. The sample set size, from this point of view, is experimentally established in order to fulfill the next condition:

$$RRIF_{(x)} \approx RSSF$$

Statistically, the authentication process is thus related to the whole subjects database, eliminating thus the disadvantages of the subject personalized metrics systems with threshold type decision.

The invention claimed is:

1. A computer based system for acquisition, analysis and authentication of the handwritten signature comprising a pen-subsystem for acquiring signals and transmitting information to further subsystems integrated in a personal computer which, in its turn, is network connected to further subsystems integrated in server, which, in its turn, may or may not be network connected to other personal computers each having connected as peripheral a pen-subsystem, wherein, the pen-subsystem comprises:
   a metallic case for electromagnetic shielding;
   two MEMS acceleration sensor groups, placed in two different parallel planes with the same orientation regarding their x, y orthogonal sensing axes, and having set the frequency band response between 0 Hz and 100 Hz for capturing two acceleration signals from each the sensor group, all four signals containing the manifestation of two simultaneous phenomena, the first phenomenon being the contact micro vibrations generated by the feedback loop type interaction of the hand-guided pen movements with the paper during writing, manifesting in a frequency range of between 10 to 60 Hz and, the second phenomenon being the tri-dimensional spatial hand and pen movements during writing, namely spatial kinetic information, manifesting in a frequency range of between 0 to 10 Hz;
   a pen refill with a writing lead and a body made of plastic material that allows the transmission of the frequency band specific to the contact micro vibrations;
   a printed circuit board, having a thickness lower than 0.5 mm, in permanent contact with the pen refill body, on the printed circuit board both the sensor groups being placed under a fixed angle equal to 45°, between the writing tip of the pen and the sensor group being a distance lower than 15 mm, and between the two sensor groups being a distance higher than 30 mm,
      the distance being necessary to capture the contact micro vibrations transmitted from the pen refill through the printed circuit board to sensor groups, and
      the distance being necessary to capture the spatial kinetic information;
   an infrared LED and infrared light sensor, both placed in the writing top of the pen-subsystem, sensor taking over a quantity of infrared light emitted by infrared LED and reflected from the paper;
   a microcontroller for acquisition, digitizing and coding of the signals from the sensor groups and from sensor, at a sampling rate of 1000 Hz, the signal from sensor being compared to a predetermined threshold value in order to generate the context information as a boolean value which is 1 if, and only if, the pen-subsystem is in proximity of the paper, and in a proper writing position, the resulting digitized signals, namely ax, ay from sensor group, bx, by from sensor group and the context information from sensor, being coded together and serialized;
   a micro system for the conversion and transmission of the serial data from the microcontroller in USB format; and
   a USB connection cable for the transmission of the data from the micro system to the subsystem, the cable having a no more than 2.5 mm diameter, so that to have a minimal influence on the hand gestures during writing.

2. The method defined in claim 1, the analysis and saving of the handwritten signature and the authentication of the user being carried out by comparing the acquired signature with signatures from a database, wherein, in the first stage it takes place the acquisition of the entrance signals ax and ay from sensor A, of the entrance signals bx and by from sensor B, and of the context information from sensor C, in the second stage it takes place the start-stop analysis of the acquired signals to determine the beginning and the end of the entrance signature, which includes a data processing phase to extract the contact information by high-pass filtering the signals ax and ay from sensor A and the context information from sensor C, and the start-stop moments detection phase using the filtered contact information and context information, in a third stage it takes place the signature recognition, implemented by two independent signature recognition algorithms abbreviated as SRA1 and SRA2, each of them having a signature conversion phase containing filtering, post processing and generation of algorithm specific components, and a second phase of comparison between the entrance signature and each signature from the current comparison database formed by the samples of a certain number of users randomly extracted from the current signatures database which is comprised from an initial database which contains the samples of a minimum number of subjects needed for applying the algorithms, and the samples of the added users, including previously acquired samples of the user to be authenticated, after which, for each algorithm, a result vector is obtained, and in the end, in order to provide the final answer for the authentication process from the two result vectors, the result interpreting stage takes place.

3. The method according to claim 2, wherein, in the start-stop analysis stage, in the data processing phase, the entrance signals ax and ay which are stored in a circular buffer are high pass filtered resulting the signals i1 and i2, respectively which represent the contact information, the statistical variance is computed on the last 20 sample points of i1 and on the last 20 sample points of i2 respectively, the values of the variances are saved in a circular buffer for variance level analysis, and for the context information analysis the data obtained from the sensor C, regarding the detection of the pen's writing position, namely if the pen is in the proximity of the paper under a proper writing position, is saved in a circular buffer for the analysis of the pen's position.

4. The method according to claim 2, wherein, in the start-stop moments detection phase, through the analysis of a number of N sample points from the circular buffer for variance level analysis and of a number of N sample points from the pen's position analysis circular buffer, a start moment is evaluated if in a minimum number of points called minimum number of contact points, the variance level from the contact information analysis buffer exceeds a previously established threshold called contact information threshold level, and on a minimum number of points, called minimum number of points in writing position, from the pen's position analysis buffer, the pen is in the writing position, and after a start moment is detected, the stop moments detection takes place, verifying that either for a minimum number of points, called minimum number of non-contact points, the level of variance from contact information analysis buffer is lower than a previously established threshold, called contact information threshold level, or the pen is not in a writing position on a minimum number of points from the pen's position analysis buffer, the number being called minimum number of points in writing position, and after a stop is detected the internal start moments evaluation begins, the evaluation being identical with the start moment evaluation but with other values for the contact information threshold level, the minimum number of contact points, and the minimum number of points in the writing position, and if during an experimentally determined period of time an internal start is not detected, the previously determined stop moment is considered to be the signature's final stop, otherwise the stop detection phase is restarted, and after the detection of the signature's final stop, the stop moment validation takes place, wherein the signature is checked to exceed a minimum length, case in which the signature is saved, otherwise the start moment detection phase is restarted.

5. The method according to claim 2, wherein, for SRA1 algorithm, it takes place in the signature recognition stage, during the signature conversion phase, the transformation of the entrance signals into signature components using the direct and inverse Fourier Transform and a low-pass frequency filter, after which it takes place the components conversion into invariants defining the invariant types, where each value represents different combinations between the slopes of two consecutive segments of the curve, transforming each component in triplet sequences, represented by the invariant basic type which is one of code0-code12 values, the invariant reference amplitude which is the first sample amplitude from the samples on which the invariant is defined and the invariant reference moment which is the appearance moment of the first sample from the samples on which the invariant is defined given the wave start, after which, in order to obtain a description as close as possible to the wave shape, each component is represented as an extended codes sequence, during another sub-phase it takes place the compression and the weighing of the invariant sequences, and during the comparison phase it takes place the determination of the distances between each-two correspondent components and the combination of the determined distances.

6. The method according to claim 5, wherein the compression and weighing sub-phase contains:
a) determining an invariant sections chart;
b) sorting the sections chart, using as key the basic types extracted from the extended section types;
c) dividing the sections chart into subsections having the same basic code;
d) determining for each subsection the subsection length as number of entrances in the sections chart;
e) obtaining for each subsection the reference amplitudes average of the subsection elements
f) obtaining for each subsection the reference moment average of its elements
g) replacing the reference amplitude of each subsection element with the average of the reference amplitude of the subsection elements;
h) replacing the reference moment of each subsection element with the average of reference moments of the subsection elements;
i) sorting the sections chart in the initial order;
j) generating a new invariants sequence, as doublets type wherein the first term is the extended type of the section element, and the second term is equal to the sum of the reference moment and the reference amplitude of the section element; and
k) adjusting the weights of the invariants from the sequence obtained according to an adjusting curve, the curve being defined so that the first quarter of the total number of curve invariants have the weight multiplied by 0.5, the next invariants half have the weight multiplied by 1, and the rest have the weight multiplied by 1.5.

7. The method according to claim 5, wherein for SRA1 algorithm, during the signature comparison phase it takes place the determination of a Levenshtein-type distance between two components for which the symbol types are the extended invariants codes, the symbols costs are the invariants weights and when comparing two symbols:
if identical, the resulted cost equals the module of the subtraction between the two symbol costs;
if different as type, the resulted cost represents: the cost of the deleted symbol—if a deletion takes place; the cost of the inserted symbol—if an insertion takes place; or the sum of the two symbols costs—if a substitution takes place;
after which, for a Levenshtein-type distance D, it is taken into consideration the normalized distance and, finally, it takes place the combination of distances, so that the final distance dSRA1 corresponding to SRA1 is the average of the m distances between the components of the entrance signature and the components of the signature from the current comparison database.

8. The method according to claim 2, wherein, in the signature recognition stage, for SRA2 algorithm, in the signature conversion phase, in the filtering sub-phase, a low pass filter is applied on the signals ax, ay, bx, by resulting in four corresponding filtered entrance signals, in the post processing and component generation sub-phase, six components are generated based on the four filtered entrance signals, namely the momentary acceleration module from sensor A, the momentary acceleration module from sensor B, the momentary speed from sensor A, the momentary speed from sensor B, the acceleration centripetal component obtained by eliminating the pen's translation acceleration, the speed centripetal component obtained by eliminating the pen's translation speed.

9. The method according to claim 8 wherein, for SRA2 algorithm, during the signature recognition stage, in the signature comparison phase, the components are divided in sections, the distance between each-two corresponding components is calculated by means of a Dynamic Time Warping-type algorithm using the F-Test function as cost-function and using sections instead of points, after which the distance is normalized in the interval, and then the six distances from the six components of the entrance signature with the 6 components of the signature from the current comparison database are average weighted with experimentally determined weights to obtain the DSRA2 distance.

10. The method according to claim 2, wherein, in the result interpreting stage, two vectors of distances, obtained independently from SRA1 and SRA2 after comparing the entrance signature to each of the signatures from the current comparison signature database, are summed to form a final result vector which is sorted in decreasing order thus obtaining the rank of each of the signatures in the current comparison signature database, based on their distance from the entrance signature, and the final answer of the authentication process is decided, accepting the entrance signature as original or rejecting it as forgery, depending on the position, in the sorted result vector, of the distances to the signatures of the user to be authenticated, present in the current comparison signature database.

* * * * *